US008891013B2

(12) United States Patent
Ejima

(10) Patent No.: US 8,891,013 B2
(45) Date of Patent: Nov. 18, 2014

(54) REPEATER BEING UTILIZED BETWEEN A SOURCE AND SINK DEVICE FOR LIP-SYNCING IN AN HDMI SYSTEM

(71) Applicant: Panasonic Corporation, Osaka (JP)

(72) Inventor: Naoki Ejima, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/178,588

(22) Filed: Feb. 12, 2014

(65) Prior Publication Data

US 2014/0160351 A1   Jun. 12, 2014

Related U.S. Application Data

(63) Continuation of application No. 13/872,386, filed on Apr. 29, 2013, now Pat. No. 8,687,118, which is a (Continued)

(30) Foreign Application Priority Data

Apr. 28, 2005  (JP) .................................. 2005-131963

(51) Int. Cl.
| | |
|---|---|
| H04N 9/475 | (2006.01) |
| H04N 5/04 | (2006.01) |
| H04N 21/442 | (2011.01) |
| H04N 21/4363 | (2011.01) |
| H04N 21/434 | (2011.01) |
| H04N 21/2368 | (2011.01) |
| H04N 21/43 | (2011.01) |

(52) U.S. Cl.
CPC ............ *H04N 5/04* (2013.01); *H04N 21/44227* (2013.01); *H04N 21/43632* (2013.01); *H04N 21/4341* (2013.01); *H04N 21/2368* (2013.01); *H04N 21/4307* (2013.01)
USPC .......................................... 348/515; 348/512

(58) Field of Classification Search
USPC ................................. 348/512, 515
See application file for complete search history.

(56) References Cited

U.S. PATENT DOCUMENTS

| 4,313,135 A | 1/1982 | Cooper |
| 5,987,418 A | 11/1999 | Gentit |

(Continued)

FOREIGN PATENT DOCUMENTS

| EP | 1 675 345 | 6/2006 |
| JP | 2-082887 | 3/1990 |

(Continued)

OTHER PUBLICATIONS

International Search Report dated Aug. 1, 2006 issued in the International Application No. PCT/JP2006/308643.

(Continued)

*Primary Examiner* — Brian Yenke
(74) *Attorney, Agent, or Firm* — Wenderoth, Lind & Ponack, L.L.P.

(57) ABSTRACT

A repeater is to be provided between a source device and a sink device and be used in a Lip-sync correction system that transmits a video signal and an audio signal from the source device to the sink device through a HDMI (High Definition Multimedia Interface) transmission path and reproduces the video signal and the audio signal in synchronous with them on the sink device. A communication from the source device to the sink device is defined as a downstream communication, and a communication from the sink device to the source device is defined as a upstream communication. The repeater includes a processor that receives the video signal and the audio signal through the upstream communication and the downstream communication and processes the received video signal and the received audio signal. The processor corrects deviation between the video signal and the audio signal.

2 Claims, 21 Drawing Sheets

Related U.S. Application Data continuation of application No. 11/913,029, filed as application No. PCT/JP2006/308643 on Apr. 25, 2006, now Pat. No. 8,451,375.

(56) References Cited

U.S. PATENT DOCUMENTS

| | | |
|---|---|---|
| 6,452,974 B1 | 9/2002 | Menon et al. |
| 6,630,963 B1 | 10/2003 | Billmaier |
| 6,710,815 B1 | 3/2004 | Billmaier et al. |
| 6,738,559 B1 | 5/2004 | Yoo et al. |
| 6,785,230 B1 | 8/2004 | Ogata et al. |
| 6,906,755 B2 | 6/2005 | Lundblad et al. |
| 7,047,308 B2 | 5/2006 | Deshpande |
| 7,283,586 B2 | 10/2007 | Upton |
| 7,400,653 B2 | 7/2008 | Davies et al. |
| 7,418,012 B2 | 8/2008 | Busch |
| 7,423,693 B2 | 9/2008 | Cole |
| 7,499,462 B2 | 3/2009 | MacMullan et al. |
| 7,511,763 B2 | 3/2009 | Sasaki |
| 7,558,326 B1 | 7/2009 | Lyle et al. |
| 7,583,319 B2 | 9/2009 | Ukai et al. |
| 7,861,017 B2 | 12/2010 | Agnihotri et al. |
| 8,117,330 B2 | 2/2012 | Mukaide et al. |
| 2001/0008531 A1 | 7/2001 | Lanigan et al. |
| 2002/0126703 A1 | 9/2002 | Kovacevic |
| 2002/0140859 A1 | 10/2002 | Kariatsumari |
| 2003/0122964 A1 | 7/2003 | Hara |
| 2005/0019020 A1 | 1/2005 | Sato et al. |
| 2005/0028211 A1 | 2/2005 | Mochizuki et al. |
| 2005/0068346 A1 | 3/2005 | Ogawa et al. |
| 2005/0141857 A1 | 6/2005 | Shimozawa et al. |
| 2005/0232030 A1 | 10/2005 | Mawatari et al. |
| 2005/0259948 A1 | 11/2005 | Ando |
| 2006/0012710 A1 | 1/2006 | Sasaki |
| 2006/0072399 A1 | 4/2006 | Fujimoto et al. |
| 2006/0123063 A1 | 6/2006 | Ryan et al. |
| 2006/0156376 A1 | 7/2006 | Mukaide et al. |
| 2006/0209210 A1 | 9/2006 | Swan et al. |
| 2006/0209745 A1* | 9/2006 | MacMullan et al. .......... 370/328 |
| 2006/0259170 A1 | 11/2006 | Sasaki et al. |
| 2007/0091122 A1 | 4/2007 | Nagano et al. |
| 2007/0110110 A1 | 5/2007 | Miki et al. |
| 2007/0230913 A1 | 10/2007 | Ichimura |
| 2007/0236605 A1 | 10/2007 | Saito et al. |
| 2008/0037151 A1 | 2/2008 | Fujimoto et al. |
| 2008/0138032 A1 | 6/2008 | Leyendecker et al. |
| 2008/0151116 A1 | 6/2008 | Wang et al. |
| 2008/0151119 A1 | 6/2008 | Suzuki |
| 2008/0252782 A1 | 10/2008 | Komeno |
| 2008/0291863 A1 | 11/2008 | Agren |
| 2009/0027405 A1 | 1/2009 | Kaga |
| 2009/0244076 A1 | 10/2009 | Mawatari et al. |
| 2009/0290064 A1 | 11/2009 | Matsumoto et al. |
| 2010/0042239 A1 | 2/2010 | Moore et al. |
| 2010/0067877 A1 | 3/2010 | Ichimura et al. |
| 2010/0128176 A1 | 5/2010 | Nakajima et al. |
| 2010/0191883 A1 | 7/2010 | Nagano et al. |
| 2010/0315553 A1 | 12/2010 | Takatsuji et al. |
| 2011/0069647 A1 | 3/2011 | Shao et al. |
| 2011/0187927 A1 | 8/2011 | Simon |
| 2013/0002953 A1 | 1/2013 | Noguchi et al. |

FOREIGN PATENT DOCUMENTS

| | | |
|---|---|---|
| JP | 8-032544 | 2/1996 |
| JP | 2001-128167 | 5/2001 |
| JP | 2002-290932 | 10/2002 |
| JP | 2003-101958 | 4/2003 |
| JP | 2003-259314 | 9/2003 |
| JP | 2006-186544 | 7/2006 |

OTHER PUBLICATIONS

International Preliminary Report on Patentability issued Sep. 18, 2008 in the International (PCT) Application No. PCT/JP2006/308643.

* cited by examiner

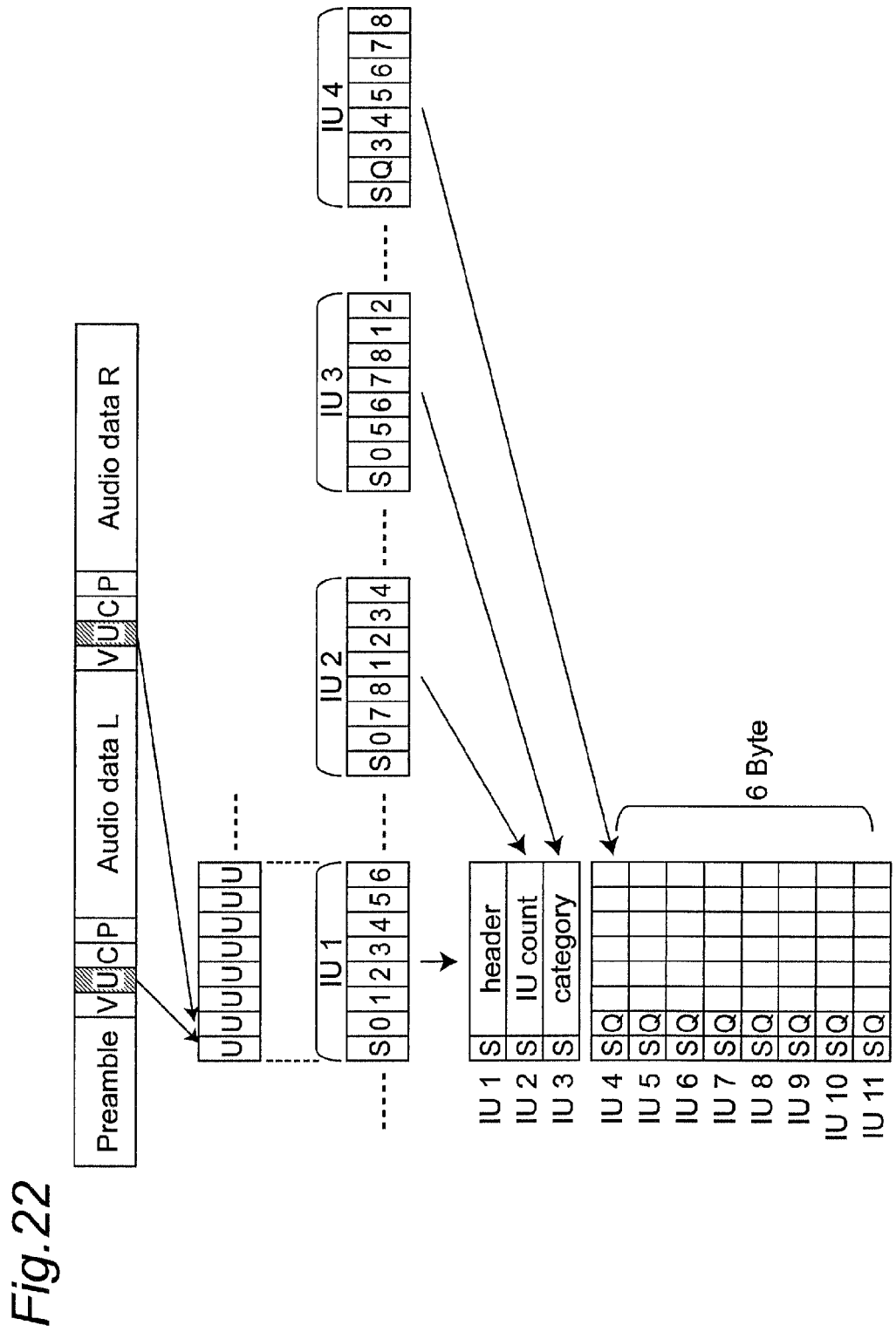

Fig.23

LATENCY

| IU # | | | | | | |
|---|---|---|---|---|---|---|
| 1 | 1 | 1 | 1 | F | | |
| 2 | 1 | | | 0 | 0 | IU count |
| 3 | 1 | | | 0 | 0 | category |
| 4 | 1 | | | | 0 | <LSB first> |
| 5 | 0 | Audio Latency Valid | Audio Latency Valid | res | res | res |
| 6 | 0 | Audio LATENCY (1) | | | | |
| 7 | 0 | Audio LATENCY (2) | | | | |
| 8 | 0 | Video Latency Valid | Video Latency Valid | res | res | res |
| 9 | 0 | Total Video LATENCY (1) | | | | |
| 10 | 0 | Total Video LATENCY (2) | | | | |
| 11 | 0 | | | | | |

} 8IUs

Audio Latency Valid  (2bit)   00: Invalid
                              10: Valid
                              others: reserved
Audio Unit_type      (2bit)   00: mili second
                              01: 1/16 mili second
                              others: reserved
Audio Latency        (16bit)  Binary (Current accumulation of Audio Latency)
Video Latency Valid  (2bit)   00: Invalid
                              10: Valid
                              others: reserved
Video Unit_type      (2bit)   00: mili second
                              01: 1/16 mili second
                              others: reserved
Total Video Latency  (16bit)  Binary (Total accumulation of Video Latency)

REPEATER BEING UTILIZED BETWEEN A SOURCE AND SINK DEVICE FOR LIP-SYNCING IN AN HDMI SYSTEM

BACKGROUND OF THE INVENTION

1. Technical Field

The invention relates to an apparatus and a method of correcting time difference of a video signal and an audio signal, that is, deviation in Lip-sync.

2. Background Art

Lip-sync is a synchronizing technology of a video signal and an audio signal in reproduction, and various methods have been proposed so far to realize Lip-sync. FIG. 24 shows an example of a conventional video-audio synchronizing system. In a source device 210, a same time stamp (time code) is multiplexed on video signal and audio signal. The video signal and audio signal on which the time stamp is multiplexed pass through various paths such as the repeaters 214 and 216, and both are finally supplied to a sink device 220. In the sink device 220, the time stamp of video signal and the time stamp of audio signal are retrieved, and the difference is detected by a time code comparator 222. On the basis of the detected difference, a video delay device 224 and an audio delay device 226 located at the final points of the respective paths are controlled. For example, when the video signal is later than the audio signal, an extra delay is given to the audio signal, and the total delay time of both signals is controlled to be identical.

Patent document 1 discloses a technology for automatically correcting the time deviation of audio signal, by comparing the time stamps of video signal and the audio signal, and delaying either the video signal or audio signal, so that the both may be matched.

Patent document 1: JP-A-2003-259314

SUMMARY OF THE INVENTION

In a conventional system, when the time stamps of video signal and audio signal can be compared and detected at the same time, that is, when both time stamps are supplied in the same device at the same time, the deviation can be detected and Lip-sync can be corrected. However, in a topology composed of separate transmission paths of video signal and audio signal, since only one time stamp can be recognized, the time difference of video signal and audio signal cannot be detected and the Lip-sync cannot be corrected.

The invention is directed to solve the above problem, and it is hence an object thereof to present a Lip-sync correcting apparatus capable of correcting the Lip-sync securely even in a topology of separate passes of the video signal and audio signal.

A repeater according to the present disclosure is to be provided between a source device and a sink device and be used in a Lip-sync correction system that transmits a video signal and an audio signal from the source device to the sink device through a HDMI (High Definition Multimedia Interface) transmission path and reproduces the video signal and the audio signal in synchronous with them on the sink device. A communication from the source device to the sink device is defined as a downstream communication, and a communication from the sink device to the source device is defined as a upstream communication. The repeater includes a processor that receives the video signal and the audio signal through the upstream communication and the downstream communication and processes the received video signal and the received audio signal. The processor receives an EDID from a downstream device through the upstream communication, calculates a first delay time which is a delay time of the video signal to be included in a EDID to be transmitted to a upstream device, by adding a delay time resulting from the processing of the video signal on the repeater, to a delay time included in the EDID received from the downstream device, obtains a second delay time which is a delay time of the audio signal and is a delay time calculated based on information included in the EDID received from the downstream device, and delays the audio signal by a difference between the first delay time and the second delay time to correct deviation between the video signal and the audio signal.

BRIEF DESCRIPTION OF DRAWINGS

FIG. 22 is a schematic diagram for explaining a transmission method of additional information to be added to an audio signal.

FIG. 23 is a diagram of format of additional information, such as latency information, additionally specified according to "General user data format".

REFERENCE SIGNS

Figure 1:
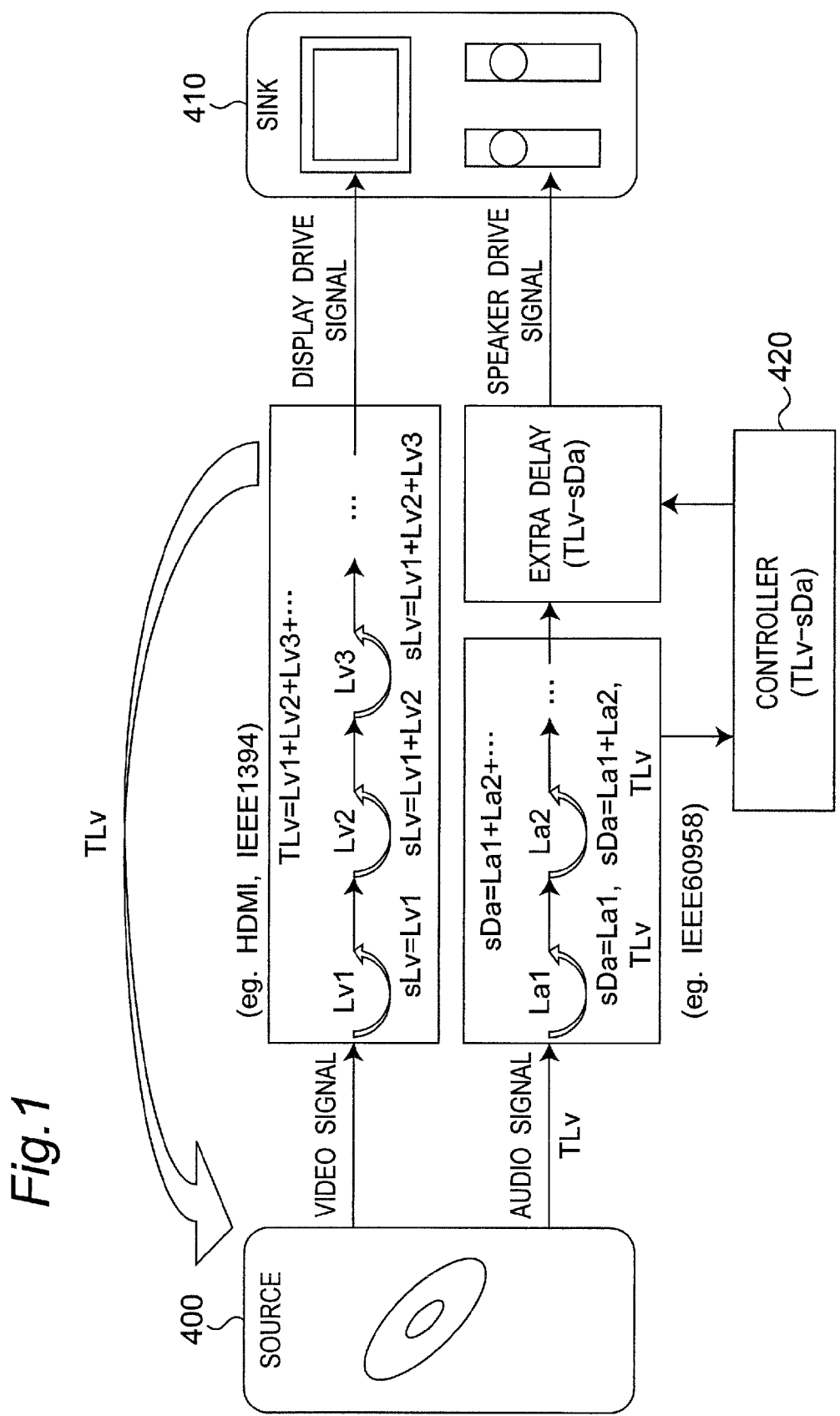
FIG. 1 is an explanatory diagram of basic concept of the invention.

100 Source
101 DVD media
102 Audio variable delay unit
110 Repeater
112 Re-encoder
120 Repeater
122 Video signal processing unit
130 Repeater
132 Signal processing unit
140 Sink device
142 Video signal processing unit
143 LCD (liquid crystal display device)
150 Sink device
151 Audio variable delay unit
152 Decoder
153 Speaker

DETAILED DESCRIPTION OF THE INVENTION

Referring now to the accompanying drawings, preferred embodiments of the invention are described below. In the drawings, the same or similar constituent elements are identified with the same reference numerals.

Basic Concept

First of all, a basic concept of the invention about Lip-sync correction is explained by referring to FIG. 1.

The invention is intended to correct deviation in Lip-sync, in an audio and video reproduction system which includes a source device 400 for generating an audio signal and a video signal and a sink device 410 for reproducing and outputting an audio signal and a video signal, with the source device 400 connected to the sink device 410 directly or by way of a repeater. The invention also includes a controller 420 achieving a function for correcting deviation of Lip-sync by applying an extra delay.

In the present invention, a video signal is transmitted through a video transmission path using a bidirectional data interface such as IEEE1394 or HDMI. The source device 400 inquires total latency of a video signal (sum of latency of devices on the video transmission path) through the video transmission path, with command sequence in IEEE1394, or with EDID (Extended Display Identification Data) in HDMI (High-Definition Multimedia Interface). The source device 400 acquires information of total latency through an up-line and transmits the information of total latency to other devices on an audio transmission path. The other devices on the audio transmission path transmit audio latency information accumulated in each device together with the video signal total latency information. The final device on the audio transmission path sends the sum of audio latency as sDa together with video signal total latency (TLv) through the audio transmission path.

The controller 420 detects sDa and TLv only from the final device. If TLv>sDa, the controller 420 adds an extra delay (TLv-sDa) to the final device on the audio transmission path.

Thus, according to the present invention, total latency information of a video signal (delay information) is acquired preliminarily, and the acquired information is transmitted to the device on the audio transmission path through the audio transmission path. On the basis of the finally obtained latency information of a video signal and an audio signal, the output time of an audio signal in the final device is adjusted, thus correcting the deviation of a video signal and an audio signal, that is, deviation in Lip-sync.

The function of the controller 420 typically is implemented in, for example, a sink device. However it may be implemented in a device other than the sink device on the audio transmission path (for example, a source device or a repeater) as far as the function of adding extra delay to the final device can be realized on the basis of the finally obtained total latency information. The extra delay may not be always added to the final device on the audio transmission path, and it may be added to any one of devices on the audio transmission path. The extra delay may also be dispersed and added to a plurality of devices.

On the basis of the concept described above, some of specific embodiments of the invention are explained below.

Embodiment 1

1. System Configuration

Figure 2:
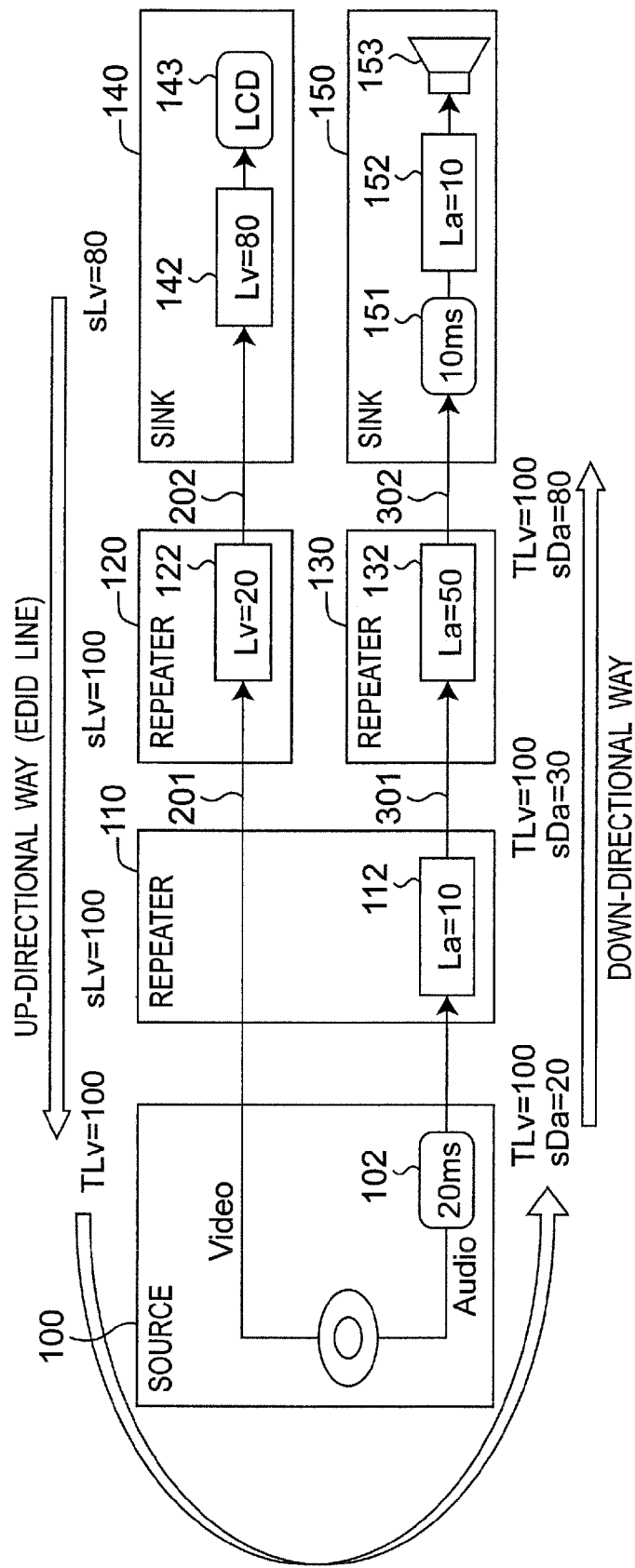
FIG. 2 is a system block diagram of a system configuration in the first embodiment of the invention.

FIG. 2 is a block diagram of a video and audio reproduction system to which the concept of Lip-sync correction of the present invention is applied.

The video and audio reproduction system includes a source device 100 for generating video and audio signals, repeaters 110 and 130 for amplifying the audio signal, a repeater 120 for amplifying the video signal, a sink device 140 for displaying video on the basis of the video signal, and a sink device 150 for outputting audio on the basis of the audio signal.

1.1 Source Device

The source device is located at the uppermost upstream of the audio or video transmission path, and serves as an output source of a video or audio signal. In the embodiment, the source device 100 is a DVD player as a reproducing apparatus of a DVD medium 101, and generates and outputs a video signal 200 and an audio signal 300.

Figure 3:
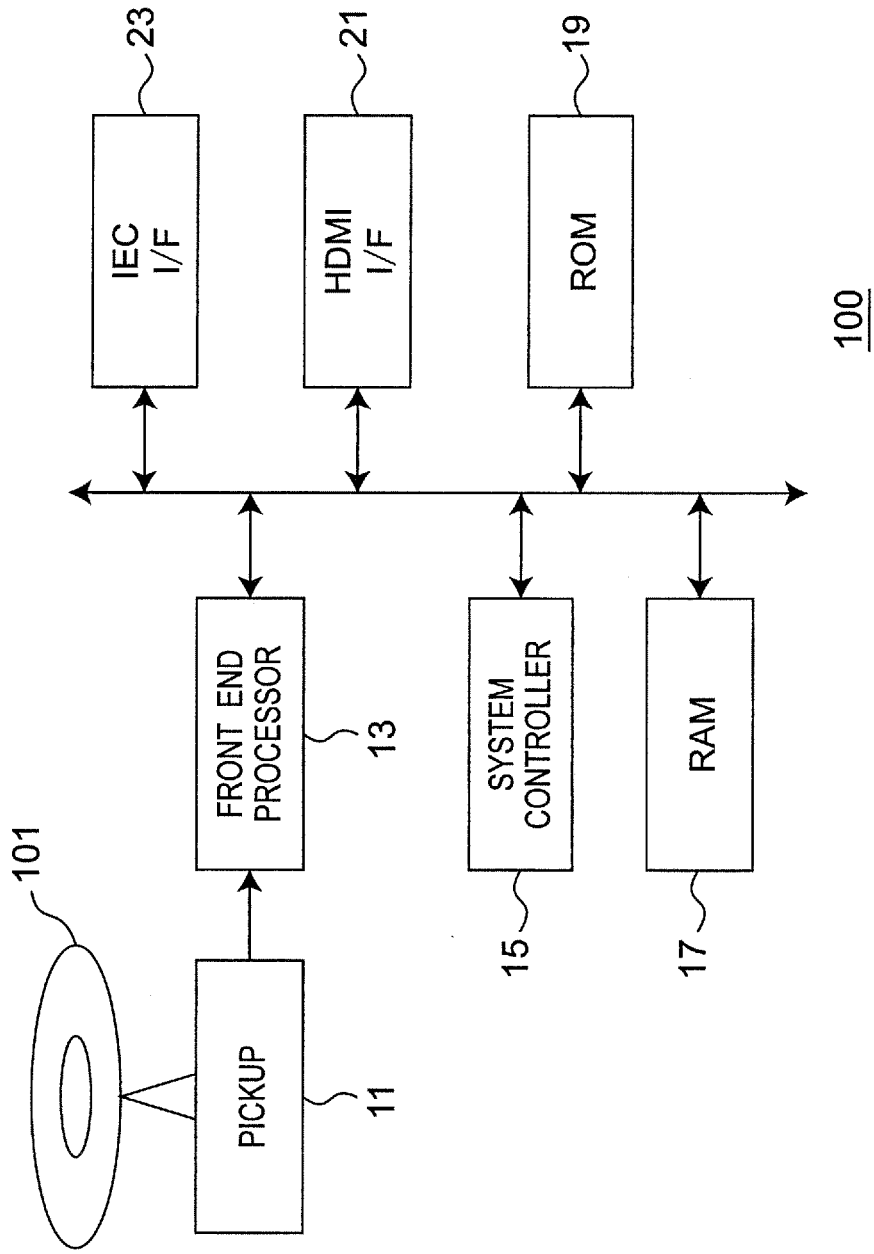
FIG. 3 is a block diagram of hardware of a source device (DVD player).

FIG. 3 shows a hardware configuration thereof. The source device 100 includes a pickup 11 for reading information from the DVD medium 101 and converting the information to an electrical signal, a front end processor 13 for receiving an output signal from the pickup 11 and generating video and audio signals, a system controller 15 for controlling the entire operation of the source device 100, a RAM 17 serving as a work area, and a ROM 19 for storing specified information. The source device 100 also has an HDMI interface unit 21 for exchanging a video signal and others with an external device, and an IEC interface unit 22 for exchanging an audio signal and others. The source device 100 realizes the following functions and processes by execution of a specified program by the system controller 15. As shown in FIG. 2, the source device 100 has an audio variable delay unit 102, which delays the audio signal 300 by a specified time (20 ms in this example) and outputs it.

The source device is not limited to a DVD player, but it may be realized by a reproducing apparatus using other media such as a hard disk player.

1.2 Sink Device

The sink device is located at the lowermost downstream of the audio or video transmission path, and outputs a video or audio signal.

Figure 4:
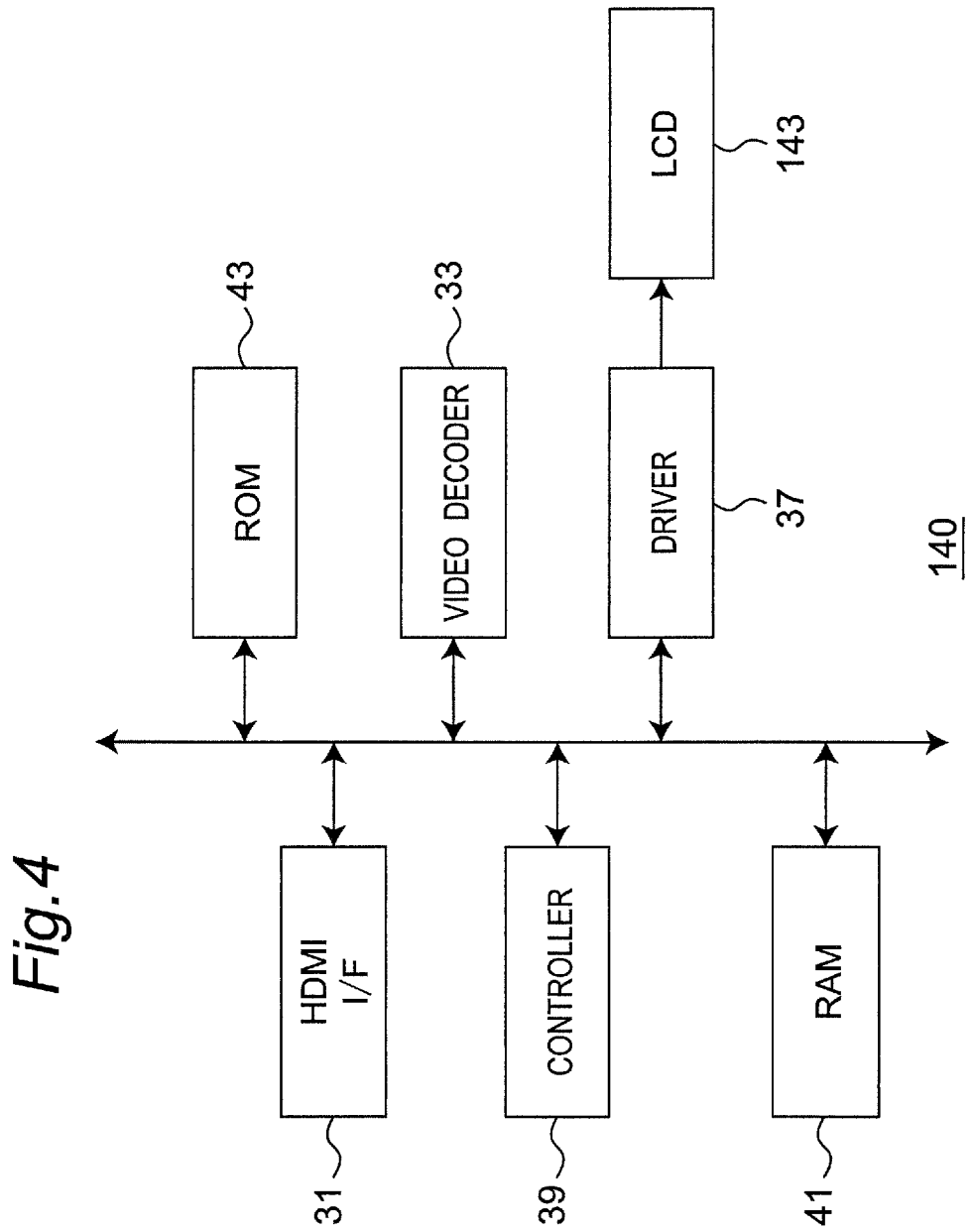
FIG. 4 is a block diagram of hardware of a sink device (video display device).

In the embodiment, the sink device 140 is a video display device and has hardware configuration as shown in FIG. 4. The sink device 140 includes HDMI interface unit 31 for receiving a digital video signal in conformity with HDMI interface, a video decoder 33 for decoding the received digital video signal, a liquid crystal display device (LCD) 143 for displaying videos, a driver 37 for generating a video signal from the decoded video signal and driving the LCD 143, a controller 39 for controlling the entire operation of the sink device 140, a RAM 41 serving as a work area of the controller 39, and a ROM 43 for storing specified information. The sink device 140 realizes the following functions and processes by execution of a specified program on the controller 39. The video decoder 33 and driver 37 shown in FIG. 4 compose a video signal processing unit 142 shown in FIG. 2. Video latency Lv of the video signal processing unit 142 is 80 ms. "Latency" is delay time from input to output of a signal in a device. Information of video latency Lv is stored in the ROM 43 of the sink device 140.

Figure 5:
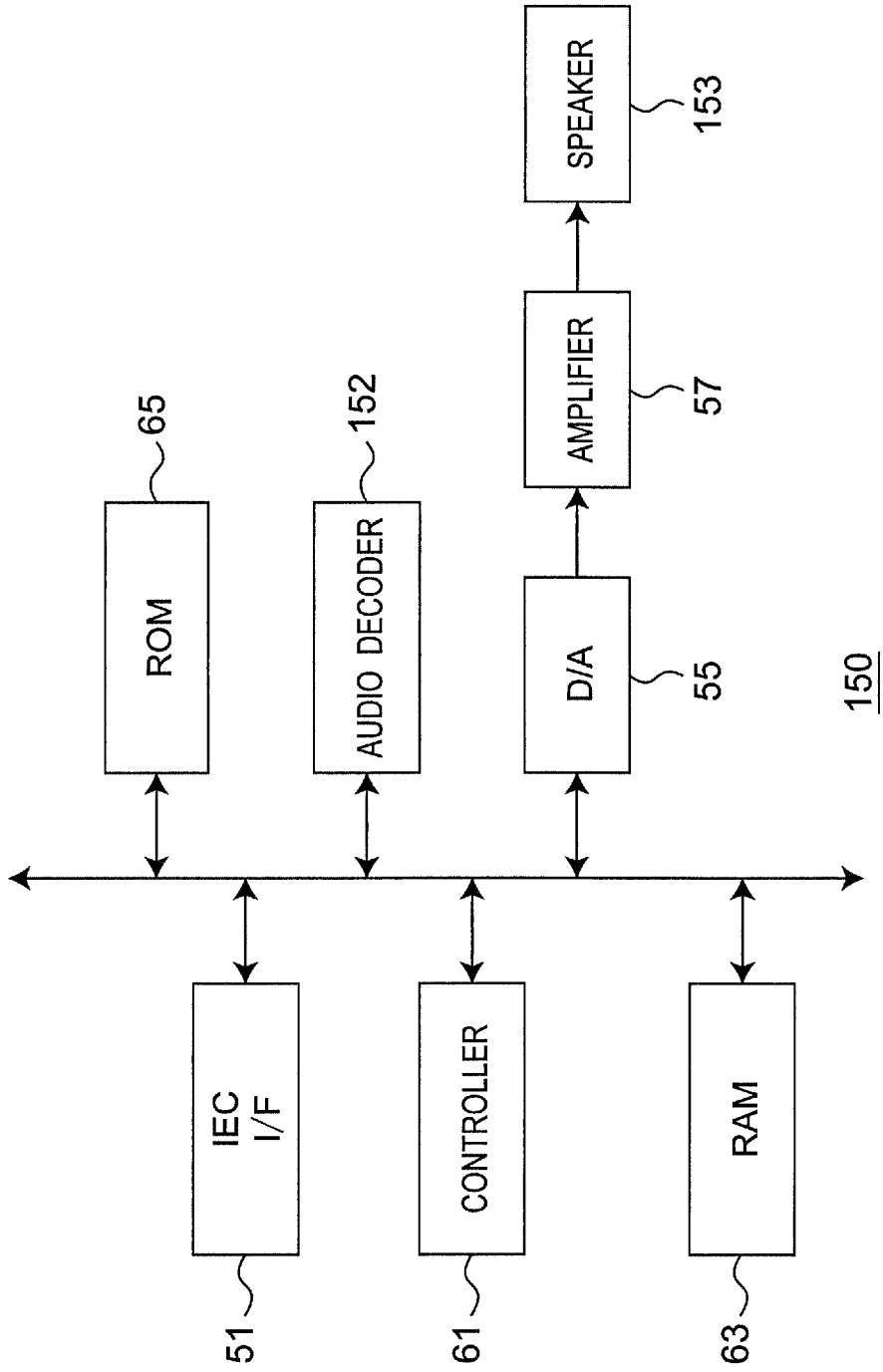
FIG. 5 is a block diagram of hardware of a sink device (audio output device).

The sink device 150 is an audio output device, and has a hardware configuration as shown in FIG. 5. As shown in FIG. 5, the sink device 150 includes an IEC interface unit 51 for receiving a digital audio signal in conformity with IEEE60958, an audio decoder 152 for decoding the received digital audio signal, a D/A converter 55 for converting the decoded signal into an analog signal, an amplifier 57 for amplifying the analog signal, a speaker 153 for outputting audio according to the output from the amplifier 57, a controller 61 for controlling the entire operation of the sink device 150, a RAM 63 serving as a work area of the controller 61, and a ROM 65 for storing specified information. Referring to FIG. 2, the sink device 150 has an audio variable delay unit 151 for delaying an audio signal by specified time (10 ms in this example). Audio latency La of the decoder 152 is 10 ms. Information of audio latency La is stored in the ROM 65 of the sink device 150.

The number and type of sink devices are not particularly limited to those stated above.

1.3 Repeater

Figure 6:
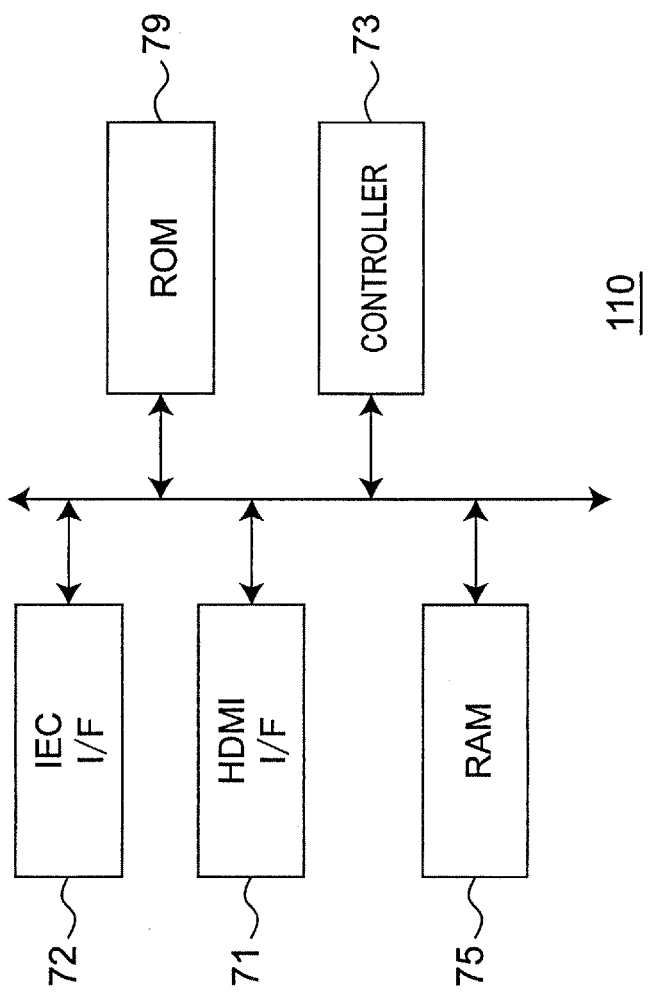
FIG. 6 is a block diagram of hardware of a repeater.

The repeater is a device disposed somewhere in the audio or video transmission path, and is an amplifier, for example. FIG. 6 shows the hardware configuration. The repeater 110 includes an HDMI interface unit 71 for receiving a digital video or audio signal in conformity with HDMI, an IEC interface unit 72 for receiving a digital video or audio signal in conformity with IEEE1394, a controller 73 for processing the received digital signal, a RAM 75 serving as a work area of the controller 73, and a ROM 79 for storing specified information such as program. The controller 73 executes the specified program to realize the following functions and processes.

Referring to FIG. 2, the repeater 110 receives a video signal 200 and an audio signal 300 from the source device 100, amplifies and outputs them as a video signal 201 and audio signal 301. The repeater 110 includes a re-encoder 112, which once decodes the audio signal 300 to read out the information, and encodes the read information again. Latency La of this re-encoder 112 is 10 ms. Information of latency La is stored in the ROM 79 of the repeater 110.

The repeater 120 has a video signal processing unit 122 for amplifying a video signal, and receives a video signal 201, amplifies, and outputs it as a video signal 202. Latency Lv of the video signal processing unit 122 is 20 ms. The repeater 130 includes a signal processing unit 132 for processing the audio signal 301 as specified, and outputs the processed signal as an audio signal 302. Latency La of the signal processing unit 132 is 50 ms. The repeaters 120 and 130 have the same structure as shown in FIG. 6, and store the respective latencies in the ROMs respectively.

The number and type of repeaters are not particularly limited to those above stated.

1.4 Interface

In the embodiment, HDMI (High-Definition Multimedia Interface) is used as a transmission interface for a video signal. "HDMI" is a standard of an interface of input/output of digital audio and video, which is established in December in 2002 and mainly directed to electric household appliances and AV devices. In conformity with HDMI, video, audio and control signals can be sent and received together through a single cable, and optionally a control signal can be transmitted bi-directionally.

In the present invention, with HDMI, the up-line function is realized, that is, a digital video signal is transmitted at high speed from the source device 100 to the sink device 140. Further, profile information of the sink device 140 is transmitted sequentially to the repeater 120, repeater 110, and source device 100. This up-line function is called hereinafter "EDID" (Extended Display Identification Data) line".

Figure 7:
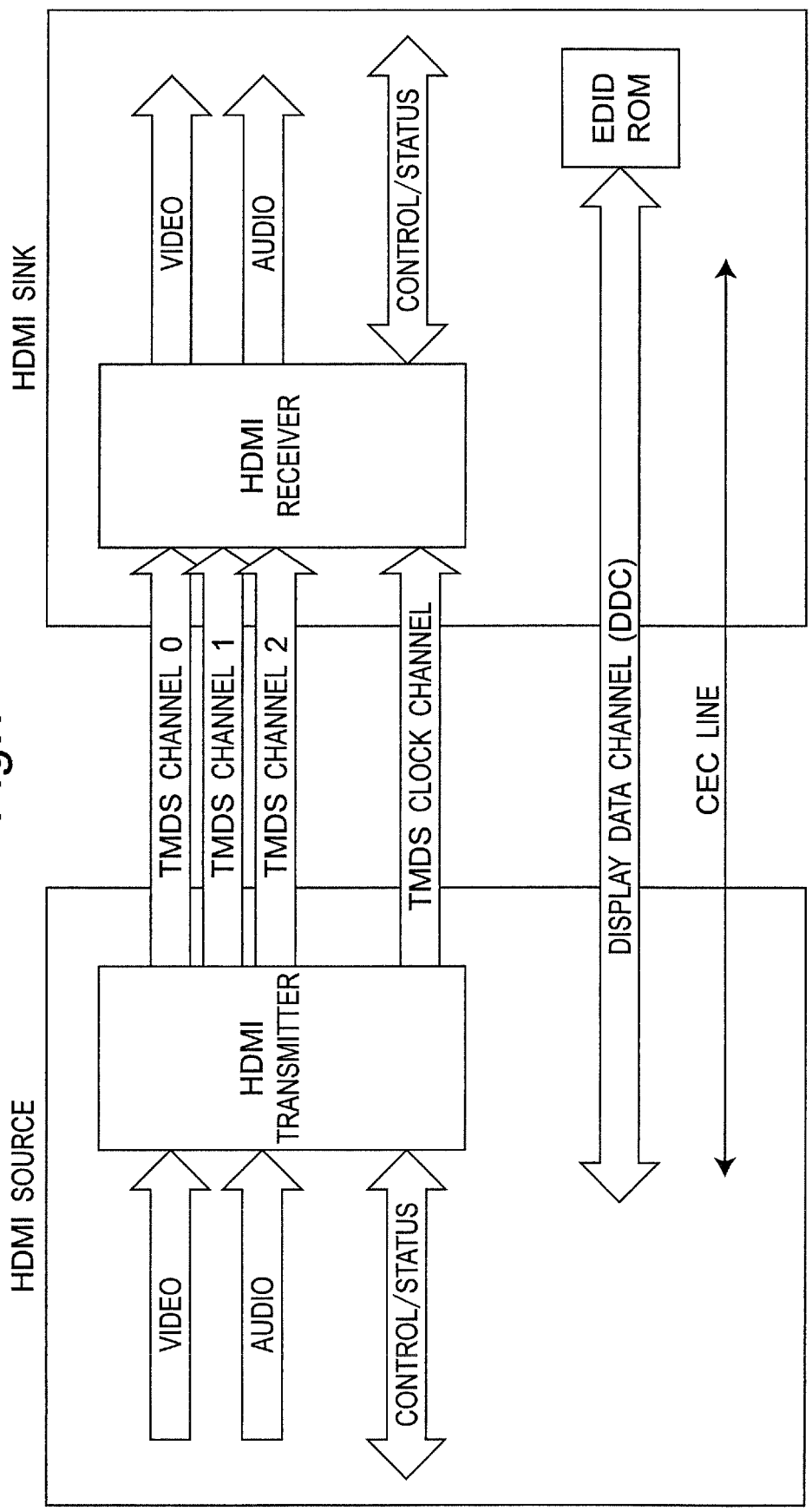
FIG. 7 is a block diagram of HDMI.

FIG. 7 shows a configuration of HDMI. As shown in the diagram, HDMI has three data channels and one clock channel, through which video data, audio data and other data are transmitted. HDMI also has a display data channel (DDC) for exchanging information on structure or status of devices. Further, HDMI has an optional CEC line through which various control signals can be transmitted bi-directionally among various AV appliances. In the present embodiment, information about latency of video and audio of appliances is transmitted through DDC. Instead of DDC, the CEC line may be used to transmit information about latency. A similar function can be realized by using IEEE1394 instead of HDMI.

Details of HDMI and EDID are disclosed in the following publication, for example:

"High-Definition Multimedia Interface Specification Version 1.1", Hitachi Ltd. et al., May 20, 2004, Internet <http://www.hdmi.org/download/HDMI_Specification_1.1.pdf>.

In the present embodiment, IEEE60958 as one-way interface is used for the audio signal transmission. In the following embodiments, HDMI as bidirectional interface may be also used for the audio signal transmission.

2. Operation

In the system configuration stated above, the video signal 200 is transmitted from the source device 100 to the sink device 140 by way of the repeaters 110 and 120 in conformity with HDMI interface. The audio signal 300 is transmitted from the source device 100 to the sink device 150 by way of the repeaters 110 and 130 in conformity with IEC60958 interface.

In the video transmission path, the total video latency TLv from the source device 100 to the sink device 140 is sum of latency Lv (20 ms) of a video signal processing unit 122 of the repeater 120 and latency Lv (80 ms) of a video signal processing unit 142 of the sink device 140, resulting in 100 ms.

In the audio transmission path, the sum of the audio latency La of devices from the source device 100 to the sink device 150 is the sum of latency La (10 ms, 50 ms and 10 ms) of the re-encoder 112 of the repeater 110, the repeater 130 and the sink device 150, resulting in 70 ms.

That is, the total video latency TLv is 100 ms, and the sum of latency La of audio signal is 70 ms (an adjustable delay time of the audio variable delay unit 151 is not included). Hence, the audio signal is reproduced earlier by 30 ms. Process of this system to solve the time difference between the video signal and audio signal in reproduction operation is described below.

2.1 General flow

Figure 8:
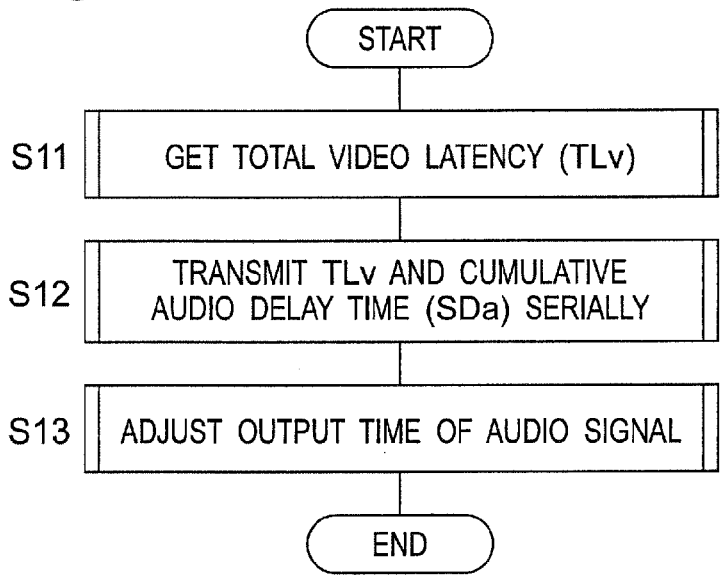
FIG. 8 is a flowchart of general operation of a system in the first embodiment.

FIG. 8 is a flowchart of general operation of the system. First, the source device at the uppermost upstream acquires the total video latency TLv of devices on the video transmission path (S11). Details of this process are explained later.

In the audio transmission path, the total video latency TLv, and the sum of delay time and latency of audio signals of devices (referred to as "cumulative delay time" hereinafter) sDa are transmitted from the source device 100 to the sink device 150 (S12). At that time, the cumulative delay time sDa of the audio signal is sequentially transmitted to the devices on the audio transmission path, while the value of latency of each device is cumulated and transmitted sequentially to the downstream.

Finally, in the sink device at the lowermost downstream, the audio is delayed and output on the basis of the value of the cumulative delay time sDa of the audio signal (S13). Thus, the audio output time is adjusted, and the difference between the video output time and the audio output time can be resolved.

2.2 Acquisition of Video Signal Total Latency TLv

Details of acquiring operation of the video signal total latency TLv (step 11 in FIG. 8) is explained.

2.2.1 Acquisition of TLv by Source Device 100

Figure 9:
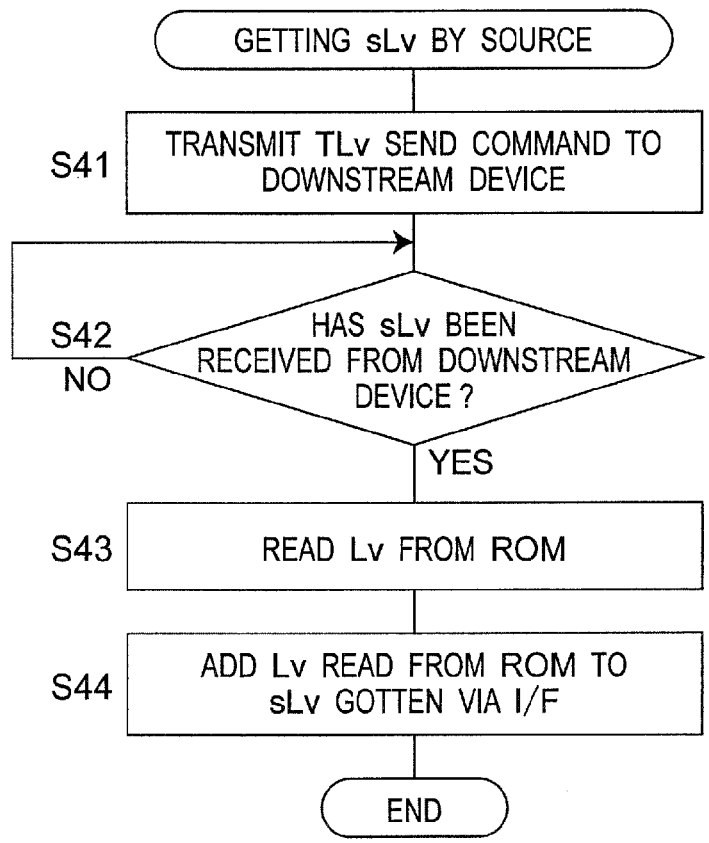
FIG. 9 is a flowchart of acquisition process of total latency of a video signal TLv by a source device in the first embodiment.

Referring to FIG. 9, acquisition of total latency TLv of the video signal by the source device 100 is explained. The source device 100 sends a TLv send command to devices (repeaters, sink device) at the downstream of the video transmission path (S41). When the TLv send command is sent from the source device, the command is sequentially transmitted to the downstream devices. Then, from the downstream to the source device 100, information sLv whish is calculated by sequentially adding latency Lv of each device is transmitted. Finally, the cumulative value of latency Lv of devices (repeaters, sink device) (referred to as "cumulative latency" hereinafter) sLv is transmitted to the source device 100. Details of this process are described below.

When receiving the cumulative latency sLv from the downstream devices (S42), the source device 100 reads out the own latency Lv from the ROM 19 (S43), and adds the read latency Lv to the cumulative latency sLv received from the downstream devices (S44). Thus, the total latency TLvs of video signal can be obtained.

2.2.2 Transmission of sLv from Repeater

Figure 10:
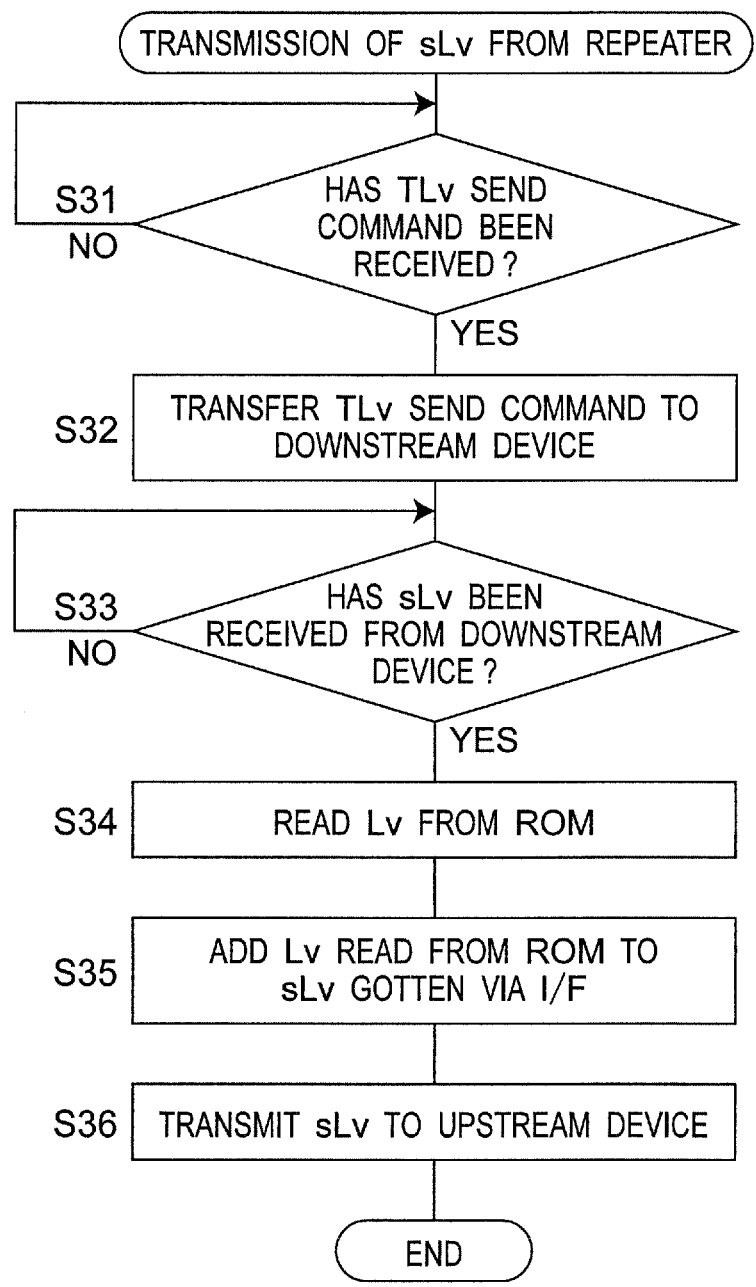
FIG. 10 is a flowchart of a process of a repeater when receiving TLv transmission command.

Referring to FIG. 10, operation of the repeater 120 upon receiving a TLv send command is explained. When receiving a TLv send command (S31), the repeaters 110 and 120 transfer the TLv command to the downstream devices (repeater, sink device) (S32), and wait for transmission of the cumulative latency sLv from the downstream devices (S33). When receiving the cumulative latency sLv from the downstream devices, the repeaters 110 and 120 read out the own latency Lv from the ROM 79 (S34). The obtained latency Lv is added to the cumulative latency sLv transmitted from the downstream devices (S35), and the newly obtained cumulative latency sLv is sent to upstream devices (repeater, source device) (S36).

2.2.3 Transmission of sLv from Sink Device

Figure 11:
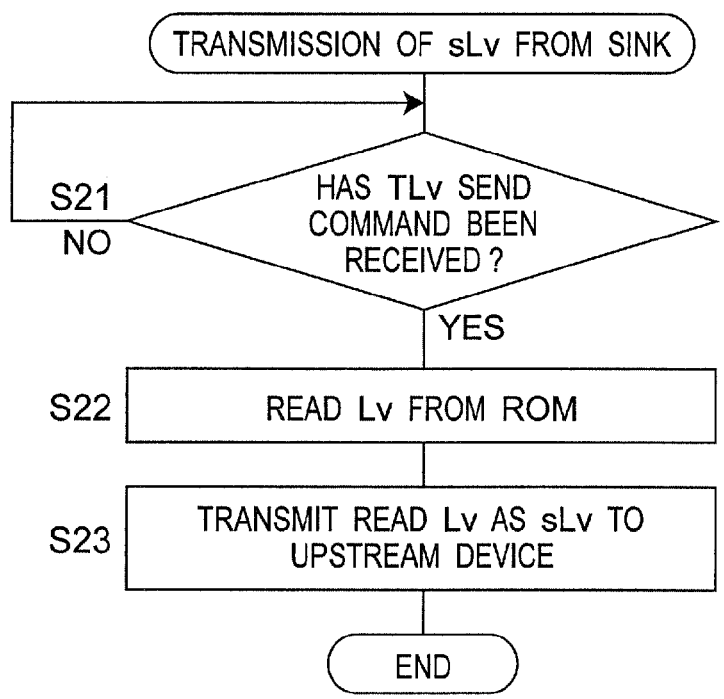
FIG. 11 is a flowchart of a process of a sink device when receiving TLv transmission command.

Referring to FIG. 11, operation of the sink device 140 when receiving a TLv send command is explained. The sink device 140 receives a TLv send command (S21), and reads the own latency Lv from the ROM 43 (S22). The read latency Lv is sent to the upstream devices (repeater, source device) as cumulative latency sLv (S23).

2.3 Transmission of Video Signal Total Latency TLv and Audio Signal Cumulative Delay Time sDa Transmission operation of the video signal total latency TLv and the audio signal cumulative delay time sDa (step S12 in FIG. 8) is detailed below.

In the audio transmission path, the video signal total latency TLv and the audio signal cumulative delay time sDa are sequentially sent from the source device 100 to the sink device 150. At this time, the latency of each device on the audio transmission path is sequentially added to the audio signal cumulative delay time sDa, and finally the total value of latency La of all devices on the audio transmission path except for the device at the lowermost downstream (sink device 150) is transmitted to the device at the lowermost downstream (sink device 150).

2.3.1 Transmission of TLv and sDa by Source Device

Figure 12:
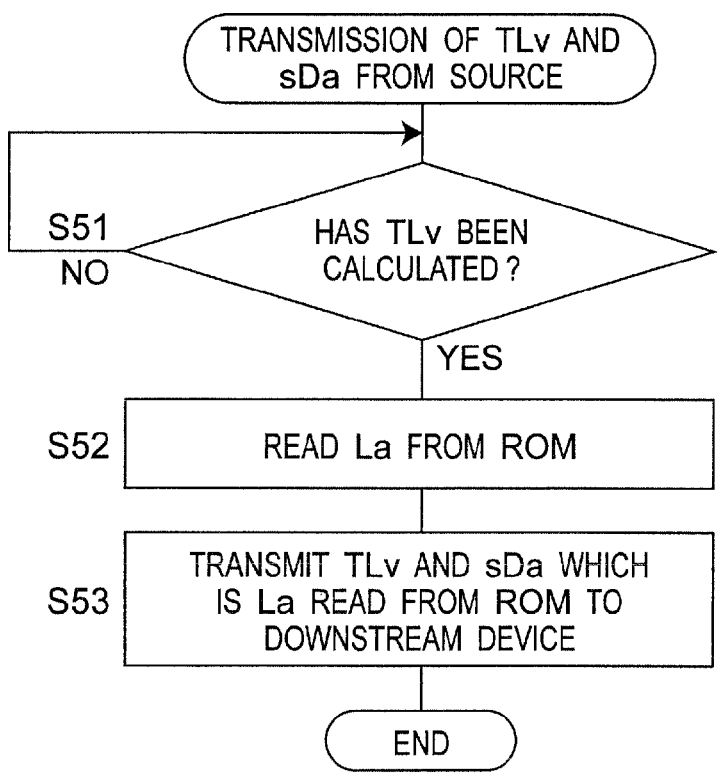
FIG. 12 is a flowchart of a process for transmission of total latency of a video signal TLv and cumulative delay time sDa of an audio signal from a source device.

Referring to FIG. 12, transmission operation of the video signal total latency TLv and the audio signal cumulative delay time sDa from the source device 100 is explained.

The source device 100 receives the video signal total latency TLv (S51), reads out own latency of audio signal La from the ROM 19 (S52), and sends the read latency La as audio signal cumulative delay time sDa to the downstream devices on the audio signal transmission path (S53).

2.3.2 Transmission of TLv and sDa by Repeater

Figure 13:
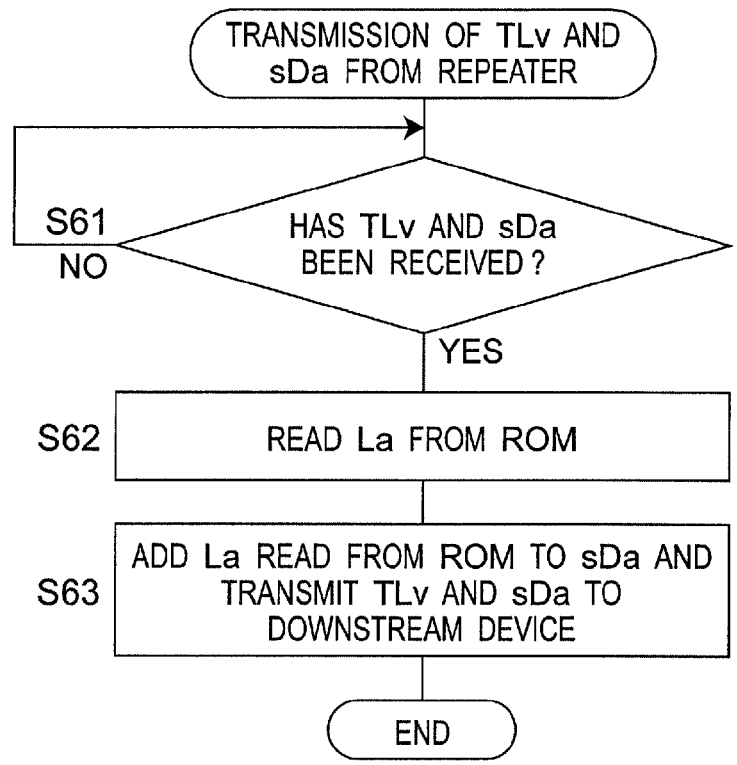
FIG. 13 is a flowchart of transmission process of total latency of video signal TLv and cumulative delay time of audio signal sDa.

Referring to FIG. 13, transmission of the video signal total latency TLv and the audio signal cumulative delay time sDa is explained.

The repeaters 110 and 130 receive the video signal total latency TLv and the audio signal cumulative delay time sDa from the upstream device (S61), and read out own audio signal latency La from the ROM 79 (S62). The repeaters 110 and 130 add the read latency La to the received cumulative delay time sDa, and send the result to the downstream devices (repeater, sink device) (S63).

2.4 Adjustment of Audio Output Time

Figure 14:
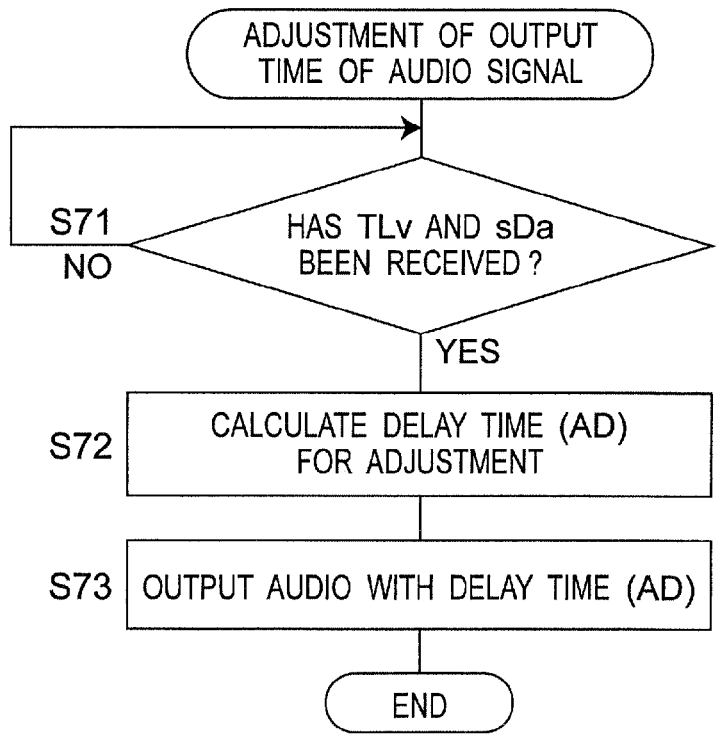
FIG. 14 is a flowchart of a process of adjustment of audio output time in a sink device.

Referring to FIG. 14, adjusting operation (step S13 in FIG. 8) of audio output time in the sink device 150 is explained.

The sink device 150 receives the video signal total latency TLv and the audio signal cumulative delay time sDa from the upstream devices (S71), and then determines delay time (AD) for output time adjustment (S72). The delay time (AD) is obtained by subtracting the signal cumulative delay time sDa from the video signal total latency TLv. Audio is presented with the output timing delayed by the specified delay time (AD) (S73).

2.5 Specific Examples of Acquisition of Total Latency TLv

Individual processes are described above, and flow of entire system of the configuration shown in FIG. 2 is explained below.

The source device 100 issues a TLv send command for acquiring video signal total latency TLv for devices from the source device 100 to the sink device 140. The TLv send command causes the sink device 140 to transmit "sLv=80 ms" which is a parameter showing latency Lv (80 ms) of the sink device 140, to the repeater 120 by way of EDID line. The repeater 120 transmits "sLv=100 ms" which is the sum of a value indicated by the received parameter of "sLv=80 ms" and the latency (20 ms) of itself, to the upstream repeater 110. The repeater 110 which have no video signal latency transfers the received value of "sLv=100 ms" directly to the source device 100.

The source device 100 set the received sLv (=100 ms) to the video signal total latency TLv (100 ms). The source device 100 multiplexes the video signal total latency TLv (100 ms), as a fixed parameter "TLv=100 ms", on the audio signal 300 to transmit it. At the same time, the source device 100 transmits the audio signal cumulative delay time sDa as additional information of the audio signal 300 to the sink device 150. In the example in FIG. 2, in the source device 100, the delay time 20 ms is set in the audio variable unit 102. Hence, the source device 100 multiplexes the parameter "sDa=200 ms" indicating delay time 20 ms of the audio variable delay unit 102 on the audio signal 300 and transmits it.

The repeater 110 receives a parameter "sDa=20 ms" from the source device 100, and accumulates the own latency La (10 ms) with the value indicated by the parameter, and transmits "sDa=30 ms" which is multiplexed on the audio signal 301. Similarly, the repeater 130 adds the own latency La (50 ms) to the cumulative delay time sDa (30 ms), and outputs "sDa=80 ms" which is multiplexed on the audio signal 302.

The sink device 150 reads the cumulative delay time sDa (80 ms), adds the own latency La (10 ms) to the delay time to obtain 90 ms as audio signal total delay time before correction. The sink device 150, similarly, reads the fixed parameter "TLv=100 ms" showing that the video signal total latency TLv is 100 ms. Thus, the sink device 150 obtains both video signal total latency (100 ms) and audio signal total delay time before correction (90 ns), and controls the audio variable delay unit 151 on the basis of the difference 10 ms as a correction value (AD). As a result, the audio signal total delay time is corrected to 100 ms.

When audio and video signals of the DVD medium 101 are synchronized in the source device 100, the video signal reproduced in the sink device 140 and the audio signal reproduced in the sink device 150 are both delayed by 100 ms. Thus, audio and video signals are finally synchronized and Lip-sync reproduction is realized.

3. Summary

In the embodiment, as described herein, each device on the video transmission path accumulates sequentially the delay time (latency) of own video signal, and transmits the result to the video transmission path according to the request from the source device. The source device acquires the video signal total delay time on the transmission path extending from the source device to the sink device, and transmits the parameter of video signal total delay time to the audio signal transmission path together with the audio signal and audio signal delay time. Each device on the audio transmission path sequentially accumulates the delay time of own audio signal, and transmits the result to the audio transmission path. As a result, the final device of the audio transmission path can know the video signal total delay time and audio signal total delay time. Accordingly, providing the extra delay of an audio signal to decrease the difference between the total delay times can correct deviation in Lip-sync. This advantage can be obtained even if the end points of the audio and video paths are different, and it is not affected by topology. Instead of time stamps, constant parameter information of latency and delay time of each device on each path can be utilized, and thus number of data transmission can be reduced.

The functions described above operate as entire system for composing the network by adding specified functions to the interface for connecting the individual devices. Therefore, when the devices have specified functions, the device can be replaced with others in the network, and the same action and effect can be obtained even if the network connection configuration (topology) is changed. In the following embodiments, several applications in various network connections (topology) are explained.

Embodiment 2

This embodiment explains an application example of the invention in system configuration realized by direct connection of a source device and a sink device. The source device is a DVD player, and the sink device is a digital television receiver (digital TV).

Figure 15A:
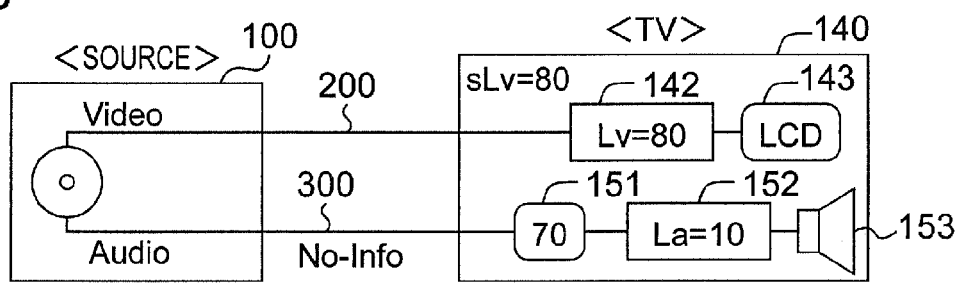
FIGS. 15A to 15C are system block diagrams each indicating a system configuration in the second embodiment of the invention.
Figure 15B:
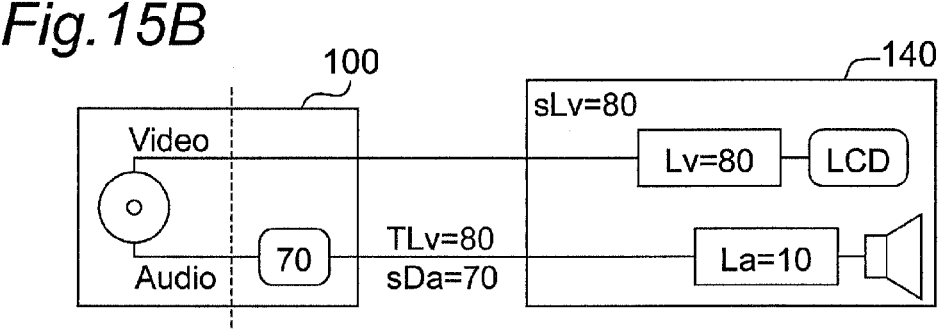
Figure 15C:
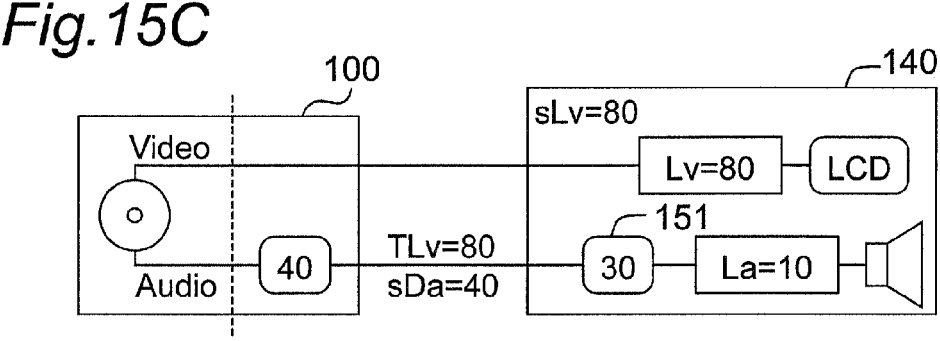

FIGS. 15A, 15B and 15C show a system configuration in the embodiment, respectively. A video signal and an audio signal are transmitted from the DVD player 100 as a source device to the digital TV 140 as a sink device, and both video and audio signals are reproduced in the digital TV 140.

The source device 100 is means for reproducing a DVD medium 101 and outputs both video signal 200 and audio signal 300 in conformity with HDMI. The sink device 140 incorporates a video signal processing unit 142 and an audio decoder 152, and outputs video and audio through a LCD 143 and a speaker 153. The speaker 153 includes an audio signal amplifier. Video signal latency Lv of the video signal processing unit 142 is supposed to be 80 ms, and audio signal latency La of the decoder 152 is supposed to be 10 ms.

FIG. 15A shows an example in which a source device 100 is a conventional device. Therefore, the source device 100 cannot acquire the video signal total latency TLv from the sink device 140, or cannot add it to the audio signal. As a matter of fact, information of the audio signal cumulative delay time sDa cannot be added to the audio signal. On the other hand, the sink device 140 recognizes that such additional information is not added to the audio signal of the source device 100. Since there is no additional information, the sink device 140 corrects Lip-sync by itself. Specifically, on the basis of the video signal latency Lv (80 ms) in the sink device 140 and the latency La (10 ms) of the decoder 152, an extra delay of 70 ms (=80−10) is produced for correcting the time difference in the audio delay unit 151. The extra delay allows the total value of delay in both video signal and audio signal to be 80 ms, thus achieving Lip-sync correction.

FIGS. 15B and 15C show examples with a source device 100 to which the concept of the present invention is applied. The source device 100 can acquire the audio signal cumulative delay time in addition to the video signal total latency TLv through EDID line, and further add these pieces of information to the audio signal. FIG. 15B shows the source device 100 having the function of the controller 420 in FIG. 1 with an extra delay added to the source device 100. FIG. 15C shows an example in which the function of the controller 420 in FIG. 1 is dispersed into the source device 100 and the sink device 140 and the extra delay is also dispersed into the source device 100 and the sink device 140.

In FIG. 15B, the source device 100 acquires the audio signal latency La (10 ms) in addition to the video signal total latency TLv (80 ms) from the sink device 140 through EDID line. Hence, the source device 100 can calculate the extra delay (70 ms) from the acquired information and produce the audio signal which is delayed by the extra delay (70 ms). Because of the extra delay, the source device 100 transmits the audio signal cumulative delay time sDa as 70 ms, as additional information of the audio signal 300. The sink device 140 can recognize that the video signal total latency is 80 ms, and that the audio signal cumulative delay time is 70 ms. Further, the sink device 140 can recognize that the latency of the decoder 152 is 10 ms and hence the audio signal total latency is 80 ms, and that further delay process is not necessary. Thus, the Lip-sync can be corrected in the system.

FIG. 15C is similar to FIG. 15B. However, the extra delay in the source device 100 is limited to 40 ms. The source device 100 delays the audio signal by the extra delay of 40 ms and outputs it. Due to the extra delay, the source device 100 adds the audio signal cumulative delay time sDa as 40 ms to the audio signal 300, and transmits it. The sink device 140 can recognize the video signal total latency TLv (80 ms), the audio signal cumulative delay time sDa (40 ms) and the latency (10 ms) of the decoder 152. Hence, the sink device 140 can recognize that the difference in delay time of a video signal and an audio signal is 30 ms. Accordingly, the sink device 140 processes the extra delay of 30 ms in the audio delay unit 151. As a result, in both video signal and audio signal, the total delay time is corrected to 80 ms, so that the Lip-sync can be corrected in the system.

Embodiment 3

Figure 16A:
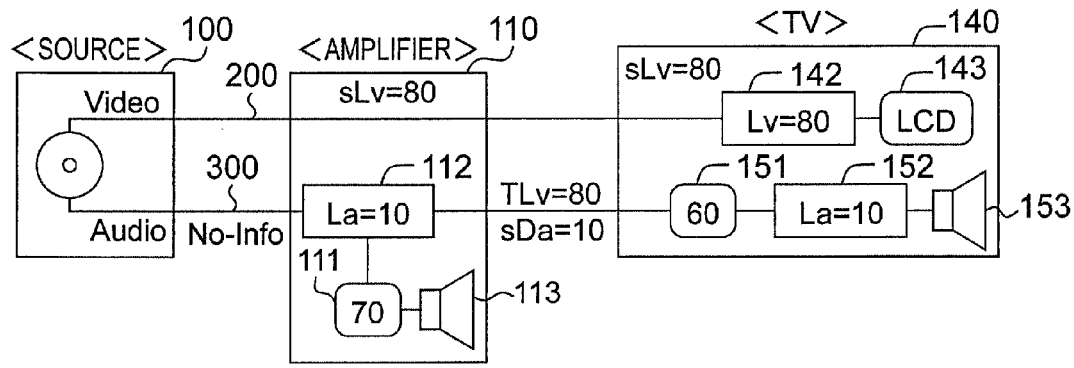
FIGS. 16A to 16C are system block diagrams each indicating a system configuration in the third embodiment of the invention.
Figure 16B:
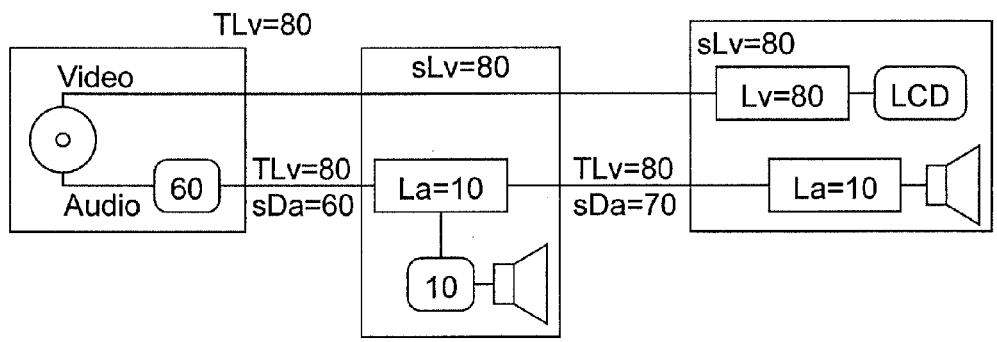
Figure 16C:
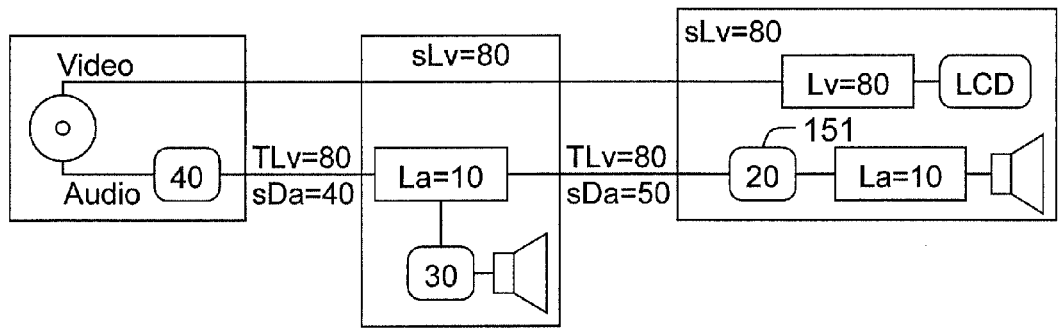

This embodiment is different from embodiment 2 in that a repeater is inserted in the audio transmission path. FIGS. 16A, 16B and 16C show a system configuration of the present embodiment, respectively. A sink device 140 as a digital TV is connected to a source device 100 as a DVD player via the repeater 110 as a multi-channel amplifier.

The source device 100 outputs a video signal 200 and an audio signal 300 reproduced from the DVD medium 101 in conformity with HDMI.

The repeater 110 has an audio signal processing function, and is used for outputting higher quality audio sound than built-in amplifier or speaker of the sink device 140, or achieving multi-channel. The repeater 110 has a re-encoder 112 and transmits the output to the sink device 140. In the repeater 110, the video signal is passed through without delay, but the audio signal is delayed by latency La of 10 ms with the re-encoder 112.

The sink device 140 is a digital TV, incorporates a video signal processing unit 142 and an audio decoder 152, and presents video and audio through a LCD 143 and a speaker 153. In the sink device 140, the latency Lv of the video signal processing unit 142 is 80 ms, and the latency La of the decoder 152 is 10 ms.

FIG. 16A shows an example in which a source device 100 is a conventional device. Therefore, the source device 100 can neither recognize the video signal total latency TL, nor add the information to the audio signal. The audio signal cumulative delay time sDa cannot be added to the audio signal.

The repeater 110 does not receive information of the audio signal cumulative delay time sDa added to the audio signal 300 through EDID line, and hence recognizes that additional information is absent. Accordingly, the repeater 110 operates with the same functions as the source device of the present invention. That is, the repeater 110 receives video signal latency Lv (80 ms) from the sink device 140 through EDID line, and recognizes that the video signal total latency TLv is 80 ms. The repeater 110 transmits information of the total latency TLv (80 ms) to the sink device 140 as additional information of the audio signal. Further, the repeater 110 multiplexes the audio signal latency on the audio signal as cumulative delay time sDa (10 ms), and transmits the result to the sink device 140.

Output of re-encoder 112 in the repeater 110 is supplied to the speaker 113 by way of the audio variable delay unit 111, a multi-channel amplifier (not shown) and others in the repeater 110. At this time, the repeater 110 controls the delay time of the audio variable delay unit 111 on the basis of difference (70 ms) between the video signal total latency TLv (80 ms) and the audio signal cumulative delay time sDa (10 ms). As a result, Lip-sync deviation between the audio output from the speaker 113 and the video output reproduced from the LCD 143 is corrected. Thus, Lip-sync can be corrected for the audio signal from the repeater 110 added for the purpose of higher sound quality.

As for the audio from the speaker of the sink device 140 usable subsidiarily, the Lip-sync can be corrected as follows. The sink device 140 calculates 60 ms as time difference between video and audio outputs, on the basis of the information from the repeater 110, from the total latency TLv (80 ms), the audio signal cumulative delay time sDa (10 ms), and the latency (10 ms) of the own decoder 152. On the basis of this information of 60 ms, the sink device 140 controls the audio variable delay unit 151 to correct each total latency commonly to 80 ms. Thus, the audio from the sink device 140 can be also corrected in Lip-sync.

FIGS. 16B and 16C show examples with a source device 100 to which the concept of the invention is applied. The source device 100 acquires audio signal cumulative delay time sDa in addition to video signal total latency TLv through EDID line, and can further add these pieces of information to the audio signal.

FIG. 16B shows the source device 100 which acquires the total latency of each of a video signal and an audio signal from the repeater 110 and the sink device 140 through the EDID line. The video signal total latency TLv is acquired by issuing the TLv send command to the downstream devices, as mentioned in Embodiment 1. The source device 100 acquires the video signal total latency 80 ms.

The source device 100 issues a command for acquiring the audio signal total latency to the downstream devices. Each downstream device when receiving this command, sends it to the upstream devices in the same way as the case of TLv send command, while adding the own latency La to the audio signal cumulative delay time sent from the downstream. As a result, the source device 100 recognizes the audio signal total latency is 20 ms (=10 ms+10 ms).

The video signal total latency is 80 ms and the audio signal total latency is 20 ms, and hence the source device 100 sets 60 ms (=80 ms−20 ms) as extra delay, and adds the extra delay to the audio signal. The source device 100 transmits information of the video signal total latency TLv (80 ms) and the audio signal cumulative delay time sDa (60 ms), as additional information of audio signal.

The repeater 110 receives these pieces of information, and controls the audio variable delay unit 111 so as to correct the difference of 20 ms of video signal total latency TLv (80 ms) and audio signal cumulative delay time sDa (60 ms). As a result, Lip-sync deviation of the audio output from the speaker 113 and video reproduced from the LCD 143 is corrected. Thus, Lip-sync can be corrected for the audio signal from the repeater 110 which is added for the purpose of higher sound quality.

As for the audio from the speaker of the sink device 140 usable subsidiarily, the Lip-sync can be corrected as follows. The sink device 140 recognizes that the video signal total latency TLv is 80 ms and the audio signal cumulative delay time sDa is 70 ms, on the basis of the information from the repeater 110, and calculates 10 ms as delay time difference of video signal and audio signal. Since this time difference of 10 ms is equal to the latency 10 ms of the sink device 140, and the sink device 140 outputs the audio signal without adding the extra delay. Thus, the audio from the sink device 140 can be also corrected in Lip-sync.

FIG. 16C is similar to FIG. 16B. However, the extra delay in the source device 100 is limited to 40 ms. Accordingly, the source device 100 adds the extra delay of 40 ms to the audio signal and outputs it. Due to this extra delay, the source device 100 transmits information of the audio signal cumulative delay time sDa (40 ms) in addition to the video signal total latency TLv (80 ms) as additional information of the audio signal 300. The repeater 110 and the sink device 140 receive this additional information. Then, the repeater 110 controls its operation so that the extra delay of the audio variable delay unit 111 may be 30 ms, and the sink device 140 controls its operation so that the extra delay of the audio variable delay unit 151 may be 20 ms, respectively. Thus, in both main and sub audio outputs, the audio total delay time is corrected to 80 ms, and the Lip-sync can be corrected in the entire system.

Embodiment 4

This embodiment explains an example in which the concept of the invention is applied to a configuration in which a source device and a sink device are connected each other and an audio transmission path is separated to plural paths with an amplifier connected to one of the separated paths. A source device (DVD player) 100, a sink device (multi-channel amplifier) 150, and a sink device (digital TV) 140 are connected through HDMI.

Figure 17A:
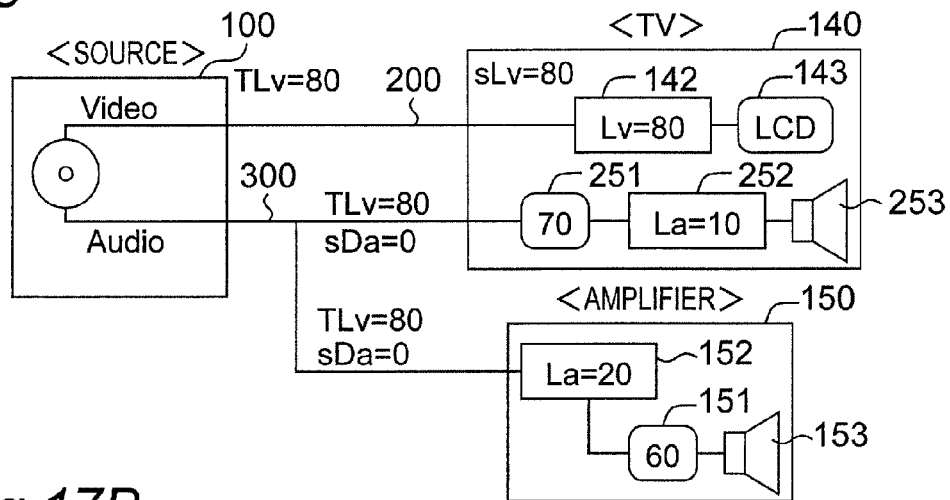
FIGS. 17A to 17C are system block diagrams each indicating a system configuration in the fourth embodiment of the invention.
Figure 17B:
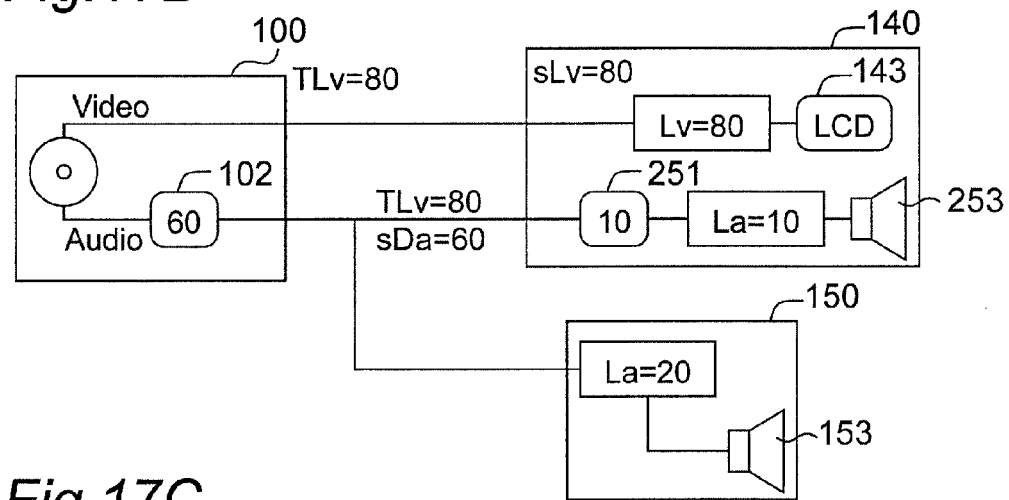
Figure 17C:
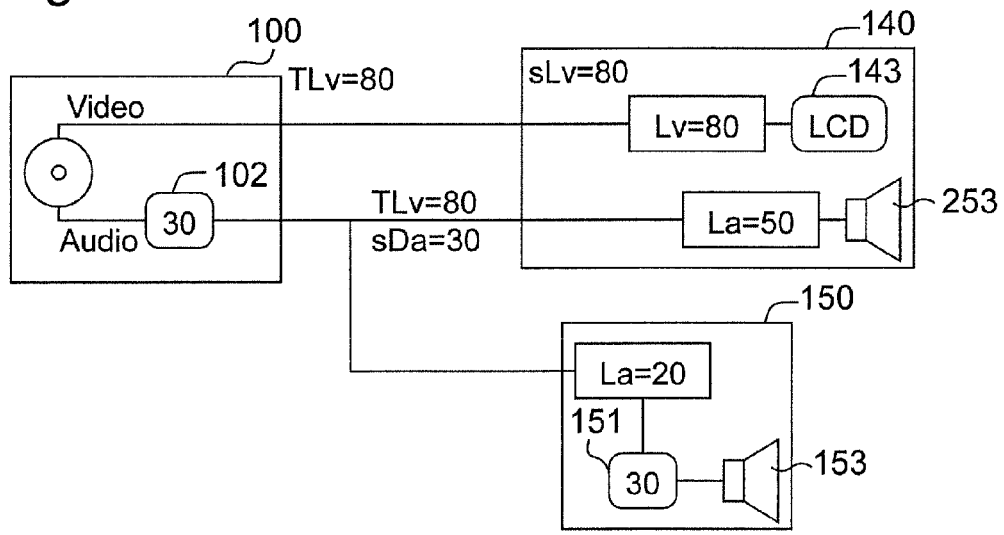

FIGS. 17A, 17B and 17C show a system configuration of the embodiment, respectively. The sink device 150 is a multi-channel amplifier, and includes a decoder 152, an audio variable delay unit 151, and a plurality of amplifiers and speakers. The source device 100 can acquire the video signal total latency TLv and the audio signal cumulative delay time sDa, and add them to the audio signal.

FIG. 17A shows an example in which the source device 100 does not add the extra delay to the audio signal. The source device 100 transmits information of the video signal total latency TLv (80 ms) to the sink device 140 as additional information of the audio signal 300 through EDID line. At the same time, the source device 100 adds the audio signal cumulative delay time sDa (0 ms) to the audio signal 300, and transmits the result to the sink device 140 and the sink device 150.

The sink device 140 calculates the delay time difference 70 ms from the received video signal total latency TLv (80 ms), audio signal cumulative delay time sDa (0 ms), and audio signal latency La (10 ms) of the sink device 140, and controls the audio variable delay unit 251 to add an extra delay of 70 ms.

Similarly, the sink device 150 calculates the time difference 60 ms from the audio signal latency La (20 ms) of the sink device 150, and controls the audio variable delay unit 151 to add an extra delay of 60 ms. Thus, the Lip-sync of LCD 143, speaker 153, and speaker 253 can be corrected.

FIGS. 17B and 17C show an example in which the extra delay of an audio signal is added in the source device 100, respectively.

In FIG. 17B, the source device 100 preliminarily knows the audio signal latency La of the sink device 140 and the sink device 150 through EDID line. According to this information, the source device 100 sets an extra delay of 60 ms in the audio variable delay unit 102 on the basis of the path to the sink device 150 which provides the maximum latency La. Information of the total latency TLv (80 ms) and the audio signal cumulative delay time sDa (60 ms) is multiplexed on the audio signal 300, and the multiplexed information on the audio signal 300 is transmitted to the sink device 140 and the sink device 150. In this case, no extra delay is needed at the sink device 150. The sink device 140 calculates the output time difference 10 ms between audio and video outputs from the received video signal total latency TLv (80 ms), the audio signal cumulative delay time sDa (60 ms), and the audio signal latency La (10 ms) of the sink device 140, and controls the audio variable delay unit 251 to provide the extra delay of 10 ms. Thus, the Lip-sync of LCD 143, speaker 153, and speaker 253 can be corrected.

In FIG. 17C, the source device 100 preliminarily knows the audio signal latency La of the sink device 140 and the sink device 150 through EDID line. Accordingly, from this, on the basis of the audio transmission path for providing the maximum latency La, the source device 100 sets the extra delay of 30 ms in the audio variable delay unit 102. The source device 100 multiplexes the video signal total latency TLv (80 ms) and the audio signal cumulative delay time sDa (30 ms) on the audio signal 300, and transmits the multiplexing result to the sink device 140 and the sink device 150. In this case, no extra delay is needed at the sink device 140. The sink device 150 calculates the time difference 30 ms by using the audio signal latency La (20 ms) of the sink device 150, from the received video signal total latency TLv (80 ms) and the audio signal cumulative delay time sDa (30 ms), and controls the audio variable delay unit 151 to provide an extra delay of 30 ms. Thus, the Lip-sync of LCD 143, speaker 153, and speaker 253 can be corrected.

Embodiment 5

This embodiment explains an example in which the concept of the invention is applied to a configuration in which a source device and a sink device are connected each other and an audio transmission path is branched with an amplifier connected to a branch.

Figure 18A:
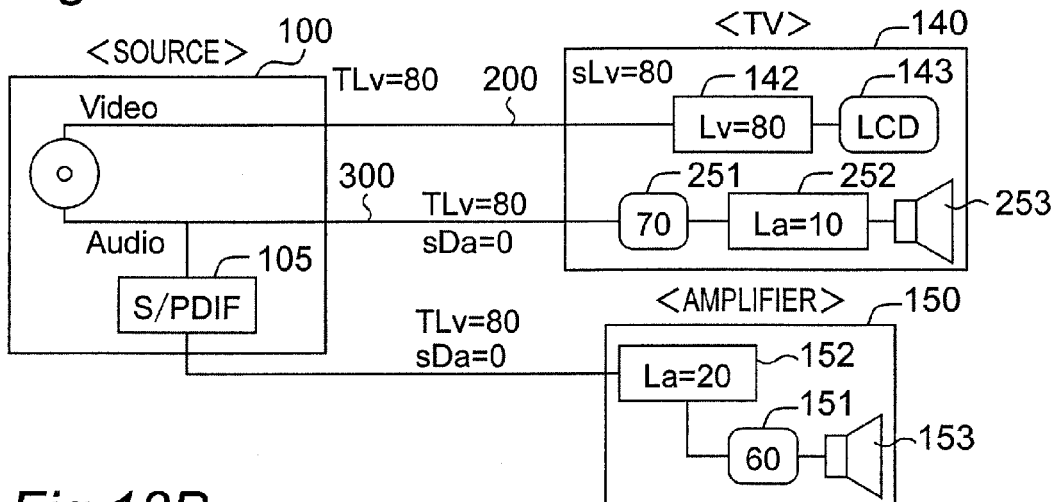
FIGS. 18A to 18C are system block diagrams each indicating a system configuration in the fifth embodiment of the invention.
Figure 18B:
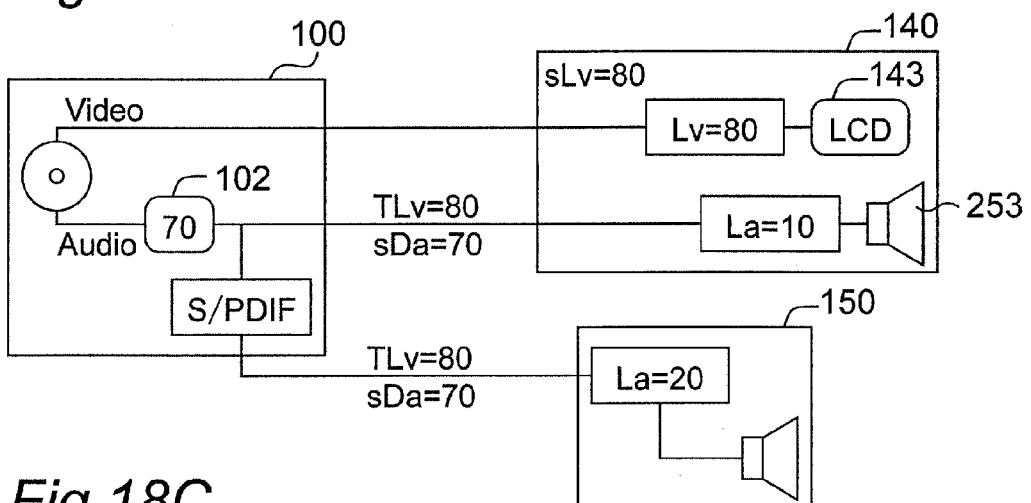
Figure 18C:
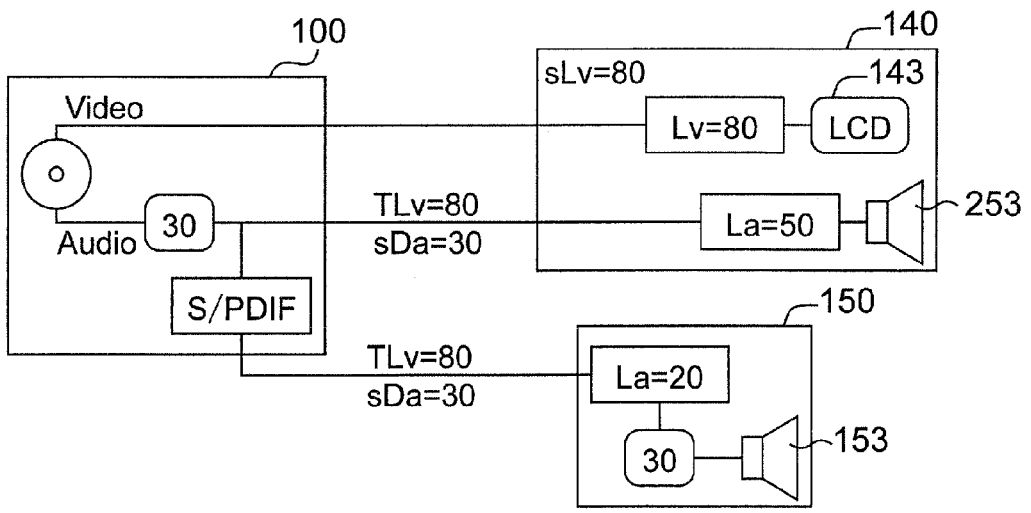

FIGS. 18A, 18B and 18C show a system configuration of the embodiment, respectively. In the embodiment, a source device (DVD player) 100 and a sink device (digital TV) 140 are connected through HDMI. Further, the source device (DVD player) 100 and a sink device (multi-channel amplifier) 150 are connected with S/PDIF interface. S/PDIF interface is an interface for transmitting digital audio or the like by using a coaxial or optical cable specified in IEC60958. Since S/PDIF interface is for a one-way transmission from the source device to the sink device, S/PDIF interface does not have an up-line from the sink device to the source device.

FIG. 18A shows an example in which the source device 100 does not add an extra delay to an audio signal. The source device 100 transmits information of the video signal total latency TLv (80 ms) to the sink device 140 as additional information of the audio signal 300 through EDID line, and multiplexes the audio signal cumulative delay time sDa (0 ms) to the audio signal 300 and transmits the multiplexed signal to the sink device 140 and the sink device 150.

The sink device 140 calculates the delay time difference 70 ms between video and audio signals from the received video signal total latency TLv (80 ms) and audio signal cumulative delay time sDa (0 ms), and the audio signal latency La (10 ms) of the sink device 140, and controls the audio variable delay unit 251 to provide an extra delay of 70 ms.

Similarly, the sink device 150 calculates the delay time difference 60 ms from the received video signal total latency TLv (80 ms) and audio signal cumulative delay time sDa (0 ms), and the audio signal latency La (20 ms) of the sink device 150, and controls the audio variable delay unit 151 to add an extra delay of 60 ms. Thus, the Lip-sync of LCD 143, speaker 153, and speaker 253 can be corrected.

FIGS. 18B and 18C show an example in which an extra delay of an audio signal is added by the source device 100, respectively.

In FIG. 18B, the sink device 150 is connected to the source device 100 through S/PDIF interface of one-way transmission, and thus the source device 100 cannot preliminarily know the audio signal latency La of the sink device 150. In the source device 100, however, the extra delay 70 ms is set preliminarily in the audio variable delay unit 102. The source device 100 multiplexes the total latency TLv (80 ms) and the audio signal cumulative delay time sDa=70 ms on the audio signal 300, and transmits the multiplexing result to the sink devices 140 and 150.

In this case, no extra delay is needed at the sink device 140. The sink device 150 calculates the delay time difference −10 ms from the received video signal total latency TLv (80 ms), the audio signal cumulative delay time sDa (70 ms), and the audio signal latency La (20 ms) of the sink device 150. To correct the delay time difference −10 ms, a video signal must be delayed. However it is impossible to do so in the embodiment, and therefore the negative delay time difference is ignored. As a result, the audio signal is delayed by 10 ms from the video signal. This phenomenon occurs often in nature due to difference in velocity between light and sound, and human sense does not feel strange with a time difference of 100 ms or less. Hence there is no particular problem if such negative delay time difference is ignored.

In FIG. 18C, the source device 100 preliminarily knows the audio signal latency La of the sink device 140 through EDID line. According to this, the source device 100 sets an extra delay of 30 ms in the audio variable delay unit 102. The source device 100 multiplexes the video signal total latency TLv (80 ms) and the audio signal cumulative delay time sDa (30 ms) on the audio signal 300, and transmits the multiplexing result to the sink devices 140 and 150. In this case, no extra delay is needed at the sink device 140. The sink device 150 calculates the delay time difference 30 ms, from the received video signal total latency TLv (80 ms) and the audio signal cumulative delay time sDa (30 ms), and the audio signal latency La (20 ms) of the sink device 150, and controls the audio variable delay unit 151 to provide an extra delay of 30 ms. Thus, the Lip-sync of LCD 143, speaker 153, and speaker 253 can be corrected.

Embodiment 6

This embodiment explains an example in which the concept of the invention is applied to a configuration in which a source device and a sink device are connected each other and an audio transmission path extends from one sink device to the other sink device.

Figure 19A:
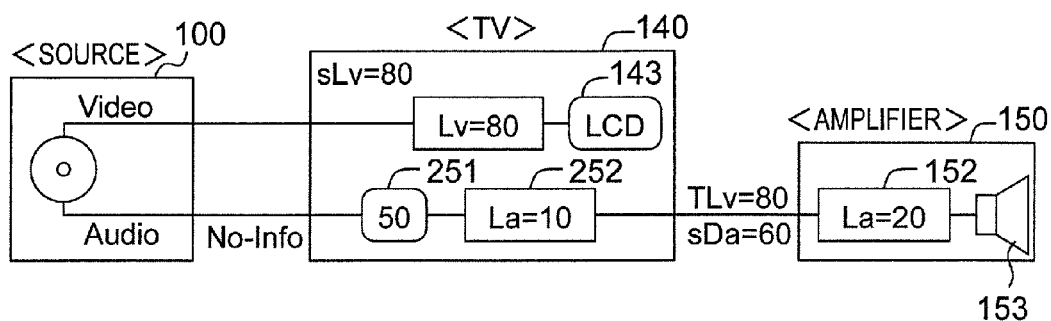
FIGS. 19A and 19B are system block diagrams each indicating a system configuration in the sixth embodiment of the invention.
Figure 19B:
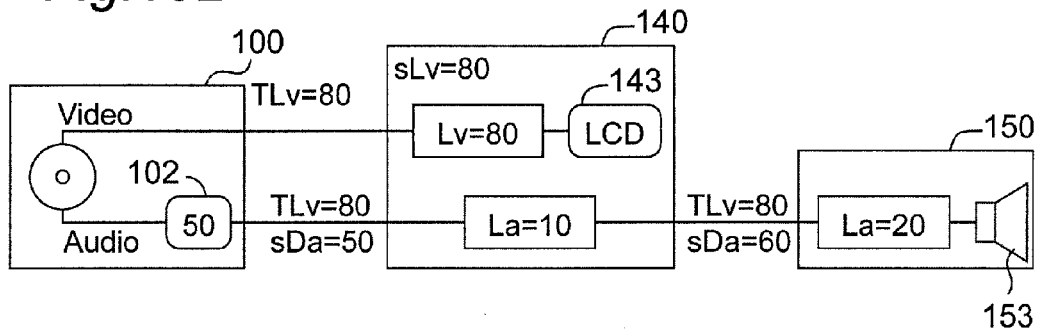

FIGS. 19A and 19B show a system configuration of the embodiment, respectively. A source device (DVD player) 100 is connected to a sink device (digital TV) 140, and further an audio signal is connected from the sink device (digital TV) 140 to a sink device (multi-channel amplifier) 150 through HDMI.

In FIG. 19A, the source device 100 is a conventional device. Therefore, the source device 100 can neither recognize the video signal total latency TLv nor add it to an audio signal, and cannot add the audio signal cumulative delay time.

On the other hand, the sink device 140 recognizes that the audio signal produced from the source device 100 does not contain such additional information. Since no additional information is present, the sink device 140 corrects the Lip-sync by it self. Specifically, the sink device 140 preliminarily acquires the audio signal latency La (20 ms) of the sink device 150 through EDID line, adds it to the own latency La (10 ms) to calculate the latency La as 30 ms. The sink device 140 generates an extra delay of 50 ms for correcting the time difference in the audio variable delay unit 251 from the video latency Lv (80 ms) and the calculated latency La (30 ms). Accordingly, the sink device 140 obtains the total latency 80 ms for both a video signal and an audio signal, thus achieving Lip-sync correction.

FIG. 19B shows an example in which the concept of the invention is applied to the source device 100. The source device 100 can recognize the latency of the sink devices 140 and 150, and thus can correct the delay more flexibly. An extra delay of 50 ms is provided in the source device 100. This allows the total latency of both video signal and audio signal to be set to 80 ms finally in the sink device 150, thus achieving Lip-sync correction.

Embodiment 7

This embodiment explains an example in which the concept of the invention is applied to a configuration in which a repeater (video processor) 120 inserted between the source device 100 and the sink device 140 is added to the system configuration shown in FIG. 17. All devices are connected via HDMI interface. In the embodiment, the repeater 120 is a video processor for processing the video signal in a predetermined way to enhance the picture quality.

Figure 20A:
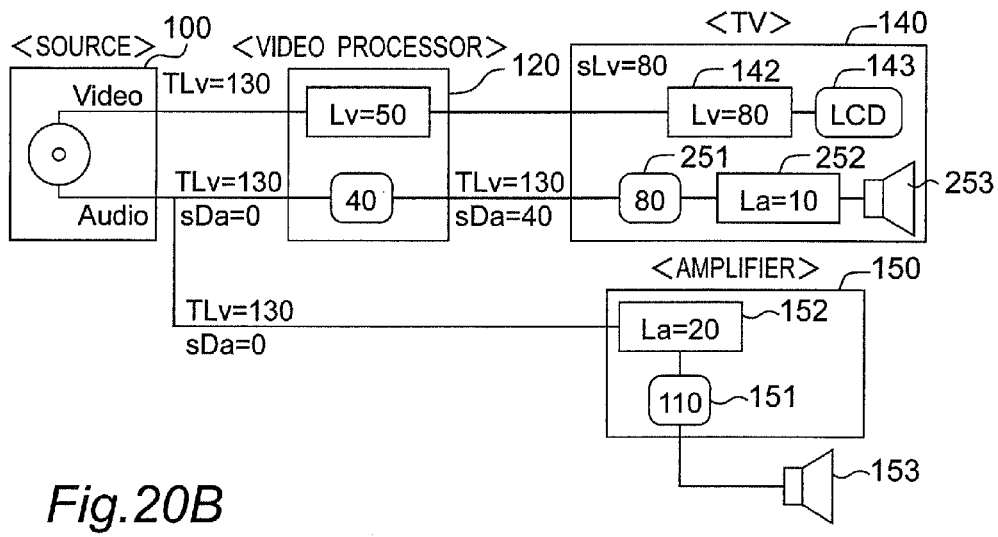
FIGS. 20A to 20C are system block diagrams each indicating a system configuration in the seventh embodiment of the invention.
Figure 20B:
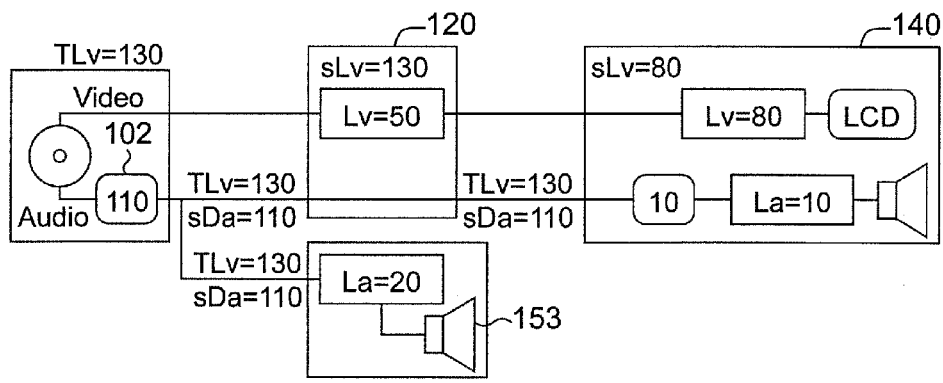
Figure 20C:
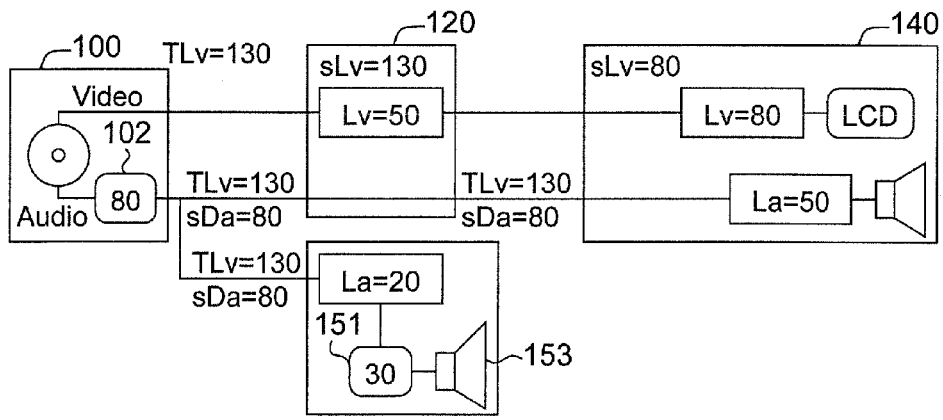

FIGS. 20A, 20B and 20C show a system configuration of the embodiment, respectively. The repeater 120 has the video signal latency Lv of 50 ms. The source device 100 can recognize the video signal total latency TLv (130 ms) through the repeater 120, and add the information to an audio signal, and further can add audio signal cumulative delay time.

FIG. 20A shows an example in which the source device 100 does not provide an extra delay of an audio signal. The source device 100 transmits information of the total latency TLv (130 ms) to the audio signal 300, multiplexes the cumulative delay time sDa (0 ms) for the audio signal latency on the audio signal, and transmits the multiplexing result. On the basis of the received information, the repeater adds an extra delay of 40 ms to the audio signal.

The sink device 140 calculates the delay time difference 80 ms from the received video signal total latency TLv (130 ms) and audio signal cumulative delay time sDa (40 ms), and the audio signal latency La (10 ms) of the sink device 140, and controls the audio variable delay unit 251 to provide an extra delay.

Similarly, the sink device 150 calculates the delay time difference 110 ms from the received video signal total latency TLv (130 ms) and audio signal cumulative delay time sDa (40 ms), and the audio signal latency La (20 ms) of the sink device 150, and controls the audio variable delay unit 151 to provide an extra delay of 110 ms. Thus, the Lip-sync of LCD 143, speaker 153, and speaker 253 can be corrected.

FIGS. 20B and 20C show an example in which an extra delay of an audio signal is added in the source device 100, respectively. In FIG. 20B, the source device 100 sets an extra delay of 110 ms in the audio variable delay unit 102. In this case, no extra delay is needed at the sink device 150.

The sink device 140 calculates the delay time difference 10 ms from the received video signal total latency TLv (130 ms) and audio signal cumulative delay time sDa (110 ms), and the audio signal latency La (10 ms) of the sink device 140, and controls the audio variable delay unit 251 to provide an extra delay of 10 ms. Thus, the Lip-sync of LCD 143, speaker 153, and speaker 253 can be corrected.

In FIG. 20C, the source device 100 sets an extra delay 80 ms in the audio variable delay unit 102. The source device 100 multiplexes the video signal total latency TLv (130 ms) and the audio signal cumulative delay time sDa (80 ms) on the audio signal 300, and transmits the multiplexing result. In this case, no extra delay is needed at the sink device 140.

The sink device 150 calculates the delay time difference 30 ms from the received video signal total latency TLv (130 ms) and audio signal cumulative delay time sDa (80 ms), and the audio signal latency La (20 ms) of the sink device 150, and controls the audio variable delay unit 151 to provide an extra delay of 30 ms. Thus, the Lip-sync of LCD 143, speaker 153, and speaker 253 can be corrected.

Embodiment 8

This embodiment explains an example in which the concept of the invention is applied to a configuration in which a repeater (video processor) 110 is inserted between a source device (DVD player) 100 and a sink device (digital TV) 140 and a sink device (multi-channel amplifier) 150 is connected to the source device via the repeater 110. The repeater 110 and sink device 150 are connected in S/PDIF interface, and other devices are connected in HDMI.

Figure 21A:
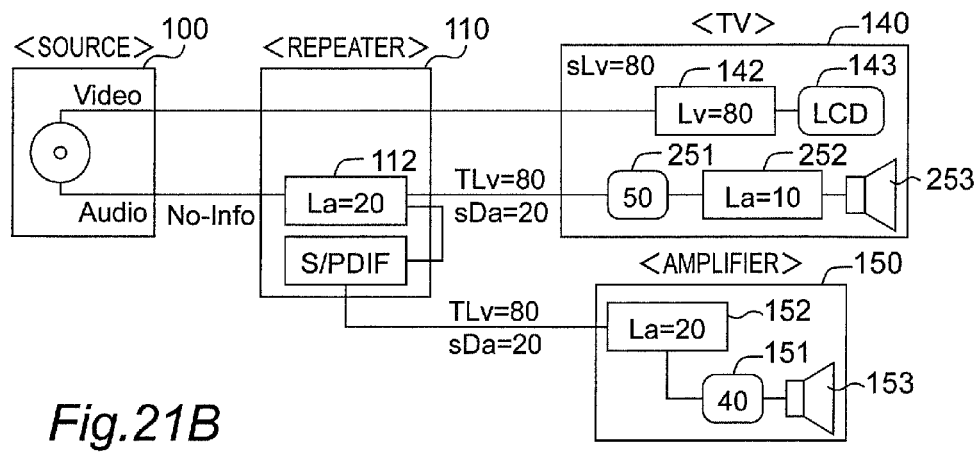
FIGS. 21A to 21C are system block diagrams each indicating a system configuration in the eighth embodiment of the invention.
Figure 21B:
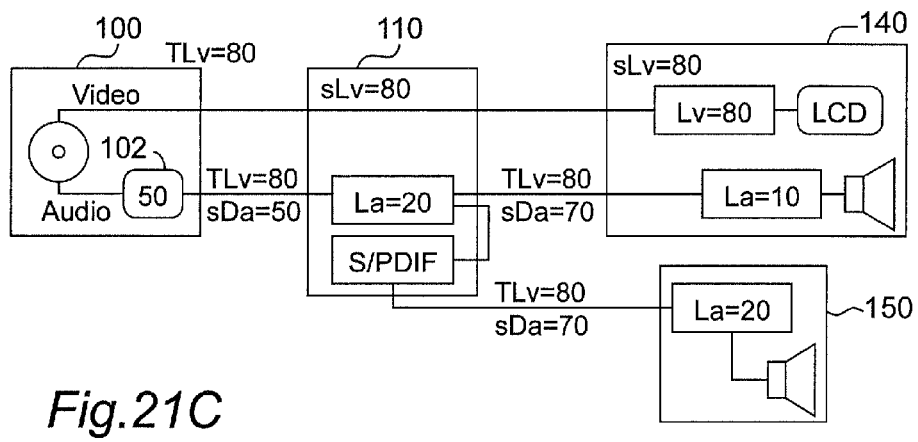
Figure 21C:
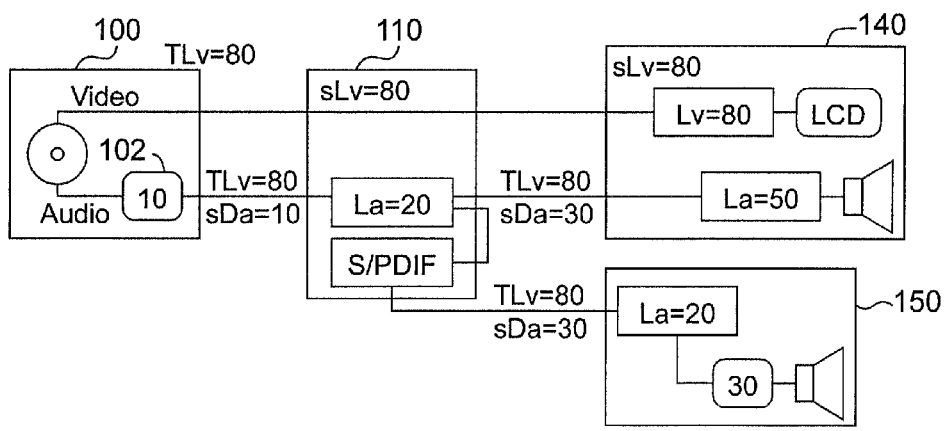
Figure 24:
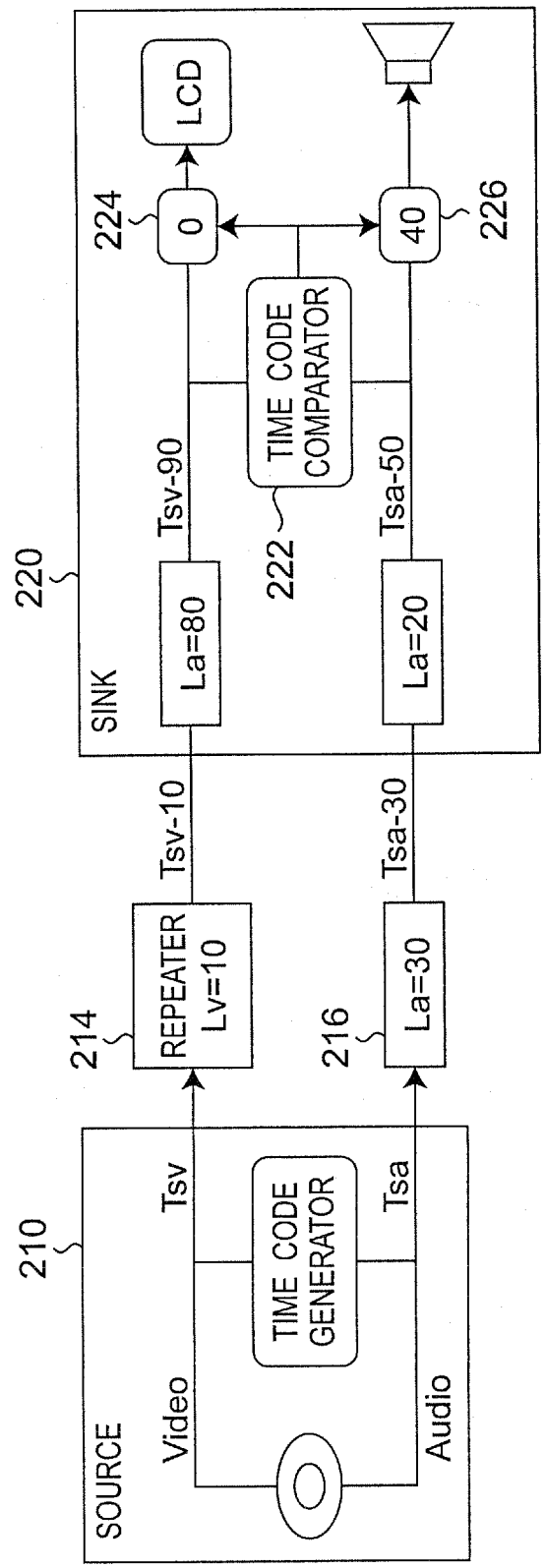
FIG. 24 is a system block diagram of connection configuration of a Lip-sync correcting apparatus in prior art.

FIGS. 21A, 21B and 21C show a system configuration of the embodiment, respectively. In FIG. 21A, the source device 100 is a conventional device which cannot recognize the video signal total latency (TLv).

The repeater 110 recognizes the video signal total latency TLv (80 ms) through EDID line. The repeater 110 sends the video signal total latency TLv (80 ms) and the audio signal cumulative delay time sDa (20 ms) to the downstream devices.

The sink device 140 calculates the delay time difference 50 ms from the video signal total latency TLv (80 ms) and audio signal cumulative delay time sDa (20 ms) which are received from the repeater 110, and the latency La (10 ms) of itself. The audio variable delay unit 251 is controlled on the basis of the calculated time difference 50 ms.

The sink device 150 receives the video signal total latency TLv (80 ms) and the audio signal cumulative delay time sDa (20 ms) through S/PDIF, calculates the delay time difference 40 ms from the received values and the own latency La (40 ms), and controls the audio variable delay unit 151 on the basis of the calculated value. Thus, all Lip-sync can be corrected.

FIGS. 21B and 21C show an example that an extra delay of an audio signal is provided in the source device 100, respectively. In FIG. 21B, since the repeater 110 and the sink device 150 are connected via S/PDIF interface, the source device 100 cannot preliminarily know the audio signal latency La of the sink device 150, but sets an extra delay of 50 ms in the audio variable delay unit 102 preliminarily.

The source device 100 multiplexes the video signal total latency TLv (80 ms) and the audio signal cumulative delay time sDa (50 ms) on the audio signal, and transmits the multiplexing result to the repeater 110. In this case, no extra delay is needed at the sink device 140.

The sink device 150 calculates the delay time difference −10 ms from the received video signal total latency TLv (80 ms), the audio signal cumulative delay time sDa (50 ms), and the audio signal latency La (20 ms) of the sink device 150. To correct the delay time difference −10 ms, it is necessary to delay the video signal, not the audio signal. However it is impossible in this embodiment to do so, and hence the delay time difference is ignored. The reason of ignoring such negative delay time difference is as described before.

In FIG. 21C, the source device 100 preliminarily knows the audio signal latency La (50 ms) of the sink device 140 through EDID line. On the basis of this value, the source device 100 sets an extra delay 10 ms in the audio variable delay unit 102. As a result, no extra delay is needed at the sink device 140.

The sink device 150 calculates the cumulative delay time difference 30 ms from the received video signal total latency TLv (80 ms) and audio signal cumulative delay time sDa (30 ms), and the audio signal latency La (20 ms) of the sink device 150, and controls the audio variable delay unit 151 to provide an extra delay of 30 ms.

Thus, the Lip-sync of all LCD and speakers can be corrected.

Embodiment 9

Referring to FIG. 22, a method of superimposing additional information on the audio signal is explained. FIG. 22 is an explanatory diagram of an example of transmission of additional information by using the user bit (Ubit) specified in IEC60958.

Ubit is included in sample data of the audio signal, and one bit is added to every PCM data of L and R channels. Ubit is a bit row, and is defined in a block of 8 bits starting from a start bit. Ubit is specified to use General user data format. Therefore, conforming to General user data format, latency information and other additional information are additionally defined. Details of General user data format are described in IEC60958, in section 3.6.2.4.1.

FIG. 23 shows the format of additional information, such as latency information, additionally defined according to General user data format. The first IU1 shows to be latency information, and IU2 defines word length of information. IU3 is a copy of category code. By using eight IU units from IU4 to IU11, information of six bytes including the following items is composed.

Audio Latency Valid: Validity bit of information of audio signal cumulative delay time sDa.

Audio Unit type: Unit of information of audio signal cumulative delay time sDa.

Audio Latency Information of audio signal cumulative delay time sDa, having word length of 16 bits.

Video Latency Valid: Validity bit of information of video signal total latency TLv.

Video Unit type: Unit of information of video signal total latency TLv.

Video Latency Information of video signal total latency TLv, having word length of 16 bits.

Thus, transmission using Ubit is intended to keep generality wide regardless of category. Further, time codes of SMPTE standard can be transmitted.

By using the digital audio interface conforming to the IEC standard in this manner, latency information necessary for the present invention can be transmitted. That is, the digital audio interface conforming to the IEC standard can be applied in the S/PDIF interface in the foregoing embodiments.

In HDMI, the audio transmission format in conformity with IEC60958 is specified. In other words, IEC60958 format is transmitted as being included in HDMI format. That is, by using Ubit in the exactly same way as IEC60958, all latency information used in the invention can be transmitted in the format of IEC60958 also in HDMI. Further by using the format called IEC conformant specified by AMP protocol of IEC61883 (1394), the latency information of the invention can be transmitted by the 1394 interface exactly in the same manner.

The invention is specifically described herein by referring to specified embodiments, but may be changed or modified in various forms by those skilled in the art without departing from the spirit of the essential characteristics thereof. Therefore, the invention is defined only by the appended claims rather than by the description preceding them. This application is related to Japanese Patent Application No. 2005-131963 (filed on Apr. 28, 2005), the entire contents of which are incorporated herein by reference.

The present invention is particularly useful in AV devices processing audio and video signals, networks with interfaces connecting those AV devices, and other apparatuses, AV appliances, and interfaces in a wide range.

What is claimed is:

1. A reproduction synchronizing method for synchronizing reproduction of a video signal and reproduction of an audio signal with each other in a sink device, in a Lip-sync correction system that sends the video signal and the audio signal to the sink device from a source device via a repeater through a TMDS channel and reproduces the video signal and the audio signal in synchronous with each other in the sink device, wherein the repeater
receives the video signal and the audio signal from the source device through the TMDS channel, receives an EDID to be transmitted through a display data channel different from the TMDS channel, from the source device, (1) obtains a first total delay time which is a total delay time of the video signal resulting from the transmission of the video signal, from the received EDID, (2) further obtains a second total delay time which is a total delay time of the audio signal resulting from the transmission of the audio signal, from the received EDID, (1) adds a delay time resulting from processing of the video signal in the repeater to the first total delay time to calculate a new first total delay time, sends the calculated new first total delay time to the sink device though the display data channel via the EDID, (2) adds a delay time resulting from processing of the audio signal in the repeater to the second total delay time to calculate a new second total delay time, sends the calculated new second total delay time to the sink device though the display data channel via the EDID, and (3) sends the received video signal and the received audio signal to the sink device though the TMDS channel, the sink device receives the EDID to be transmitted though the display data channel from the repeater, obtains the first total delay time and the second total delay time from the received EDID, further receives the video signal and the audio signal though the TMDS channel, and synchronizes the reproduction of the video signal and the reproduction of the audio signal with each other by delaying the reproduction of the audio signal based on the obtained first total delay time and the obtained second total delay time, and the EDID stores flag information indicating whether the first total delay time and the second total delay time are stored in the EDID, and stores the first total delay time and the second total delay time when the flag information indicates that the first total delay time and the second total delay time are stored in the EDID.

2. A reproduction synchronizing method for synchronizing reproduction of a video signal and reproduction of an audio signal with each other in a sink device, in a Lip-sync correction system that sends the video signal and the audio signal to the sink device from a source device through a TMDS channel and reproduces the video signal and the audio signal in synchronous with each other in the sink device, wherein the sink device receives the video signal and the audio signal from the source device through the TMDS channel, receives an EDID to be transmitted through a display data channel different from the TMDS channel, from the source device, (1) obtains a first total delay time which is a total delay time of the video signal resulting from transmission of the video signal, from the received EDID, (2) further obtains a second total delay time which is a total delay time of the audio signal resulting from transmission of the audio signal, from the received EDID, (1) adds a delay time resulting from processing of the video signal in the sink device to the first total delay time to calculate a new first total delay time, (2) adds a delay time resulting from processing of the audio signal in the sink device to the second total delay time to calculate a new second total delay time, and synchronizes reproduction of the video signal and reproduction of the audio signal with each other by delaying the reproduction of the audio signal based on the calculated new first total delay time and the calculated new second total delay time, and the EDID stores flag information indicating whether the first total delay time and the second total delay time are stored in the EDID, stores the first total delay time and the second total delay time when the flag information indicates that the first total delay time and the second total delay time are stored in the EDID.

\* \* \* \* \*